(12) United States Patent
Kwon et al.

(10) Patent No.: US 12,541,191 B2
(45) Date of Patent: Feb. 3, 2026

(54) METHOD AND APPARATUS FOR OPTIMIZING SYNTHETIC CONDITIONS FOR GENERATION OF TARGET PRODUCTS

(71) Applicant: SAMSUNG ELECTRONICS CO., LTD., Suwon-si (KR)

(72) Inventors: Youngchun Kwon, Yongin-si (KR); Seokho Kang, Suwon-si (KR); Jin Woo Kim, Suwon-si (KR); Dongseon Lee, Suwon-si (KR); Younsuk Choi, Seongnam-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 927 days.

(21) Appl. No.: 17/745,374

(22) Filed: May 16, 2022

(65) Prior Publication Data

US 2023/0063171 A1 Mar. 2, 2023

(30) Foreign Application Priority Data

Aug. 27, 2021 (KR) .................. 10-2021-0114066
Nov. 12, 2021 (KR) .................. 10-2021-0155792

(51) Int. Cl.
*G05B 19/418* (2006.01)

(52) U.S. Cl.
CPC .......... *G05B 19/41835* (2013.01); *G05B 2219/45092* (2013.01)

(58) Field of Classification Search
CPC .... G05B 19/41835; G05B 2219/45092; G06N 3/045; G06N 3/09; G16C 20/10
See application file for complete search history.

(56) References Cited

U.S. PATENT DOCUMENTS 6,597,958 B1 * 7/2003 Starr .................. G05B 23/0243
703/2
9,529,348 B2 * 12/2016 Kephart ........... G05B 19/41885
(Continued)

FOREIGN PATENT DOCUMENTS

KR   10-2018-0061769 A   6/2018
KR   10-2139358 B1   7/2020
(Continued)

OTHER PUBLICATIONS

Benjamin J. Shields et al., "Bayesian reaction optimization as a tool for chemical synthesis", Nature, vol. 590, Feb. 2021, 12 pages total.
(Continued)

*Primary Examiner* — Shogo Sasaki
(74) *Attorney, Agent, or Firm* — Sughrue Mion, PLLC

(57) ABSTRACT

A method of optimizing synthetic conditions includes receiving a graph-type descriptor comprising at least one of structural information of at least one reactant and structural information of a target product to be synthesized by the reactant; determining combinations of synthetic conditions for generating the target product by applying the graph-type descriptor to a prediction neural network model; selecting at least one initial condition combination from among the combinations based on a first confidence corresponding to a yield of the combinations; updating the prediction neural network model based on a ground-truth yield obtained from a result of an experiment with the initial condition combination; determining a priority of the combinations based on the updated prediction neural network model; and determining subsequent combinations of synthetic conditions based on the determined priority.

35 Claims, 11 Drawing Sheets

(56) References Cited

U.S. PATENT DOCUMENTS

| | | | |
|---|---|---|---|
| 10,545,482 B2* | 1/2020 | Dash | G05B 17/02 |
| 11,853,032 B2* | 12/2023 | Chan | G05B 19/4155 |
| 11,854,672 B2* | 12/2023 | Kwon | G16C 60/00 |
| 11,857,939 B2* | 1/2024 | Lusk | G05B 13/048 |
| 11,961,595 B2* | 4/2024 | Madrid | G06N 20/00 |
| 2004/0260421 A1* | 12/2004 | Persson | D21G 9/0018 |
| | | | 162/263 |
| 2016/0026171 A1* | 1/2016 | Dash | G05B 17/02 |
| | | | 700/267 |
| 2018/0353925 A1* | 12/2018 | Giiazov | B01J 19/0006 |
| 2019/0095819 A1 | 3/2019 | Varadarajan et al. | |
| 2020/0012265 A1* | 1/2020 | Thomsen | G06F 3/0481 |
| 2020/0379442 A1* | 12/2020 | Chan | B01J 19/0033 |
| 2021/0065851 A1 | 3/2021 | Madrid et al. | |
| 2021/0110892 A1 | 4/2021 | Kwon et al. | |
| 2021/0125060 A1 | 4/2021 | Kwon et al. | |
| 2021/0125691 A1 | 4/2021 | Wlodarczyk-Pruszynski et al. | |
| 2021/0233620 A1 | 7/2021 | Cronin | |
| 2022/0072500 A1* | 3/2022 | Lusk | C02F 1/686 |
| 2022/0260980 A1* | 8/2022 | Andreu | G06N 20/00 |
| 2022/0397886 A1* | 12/2022 | Hong | G16C 20/10 |

FOREIGN PATENT DOCUMENTS

| | | |
|---|---|---|
| KR | 10-2222125 B1 | 3/2021 |
| KR | 10-2021-0050952 A | 5/2021 |
| WO | 2016/086138 A1 | 6/2016 |

OTHER PUBLICATIONS

Mandana Saebi et al., "Graph Neural Networks for Predicting Chemical Reaction Performance", May 2021, 6 pages total.

Communication dated Dec. 20, 2022, issued by the European Patent Office in counterpart European Application No. 22181239.9.

Zhou et al., "Optimizing Chemical Reactions with Deep Reinforcement Learning," ACS Central Science, vol. 3, pp. 1337-1344, Dec. 2017, XP055582925.

Felton et al., "Multi-task Bayesian Optimization of Chemical Reactions," Apr. 2021, Total 5 pages, XP093006379.

De Almeida et al., "Synthetic organic chemistry driven by artificial intelligence," Nature Reviews, Chemistry, vol. 3, pp. 589-604, Oct. 2019, XP037237652.

Ryou et al., "Graph Neural Networks for the Prediction of Substrate-Specific Organic Reaction Conditions," ArXiv:2007.04275v2, Jul. 2020, Total 23 pages, XP081718296.

Kwon et al., "Uncertainty-aware prediction of chemical reaction yields with graph neural networks," Journal of Chemiformatics, vol. 14, 2022, Total 10 pages, XP093006303.

Kwon et al., "Generative Modeling to Predict Multiple Suitable Conditions for Chemical Reactions," Journal of Chemical Information and Modeling, Nov. 2022, Total 9 pages, XP093006367.

Kwon et al., "Exploring Optimal Reaction Conditions Guided by Graph Neural Networks and Bayesian Optimization," ACS Omega, 2022, Total 12 pages, XP093006378.

* cited by examiner

METHOD AND APPARATUS FOR OPTIMIZING SYNTHETIC CONDITIONS FOR GENERATION OF TARGET PRODUCTS

CROSS-REFERENCE TO RELATED APPLICATION

This application claims priority from Korean Patent Application No. 10-2021-0114066 filed on Aug. 27, 2021, and Korean Patent Application No. 10-2021-0155792 filed on Nov. 12, 2021, in the Korean Intellectual Property Office, the disclosures of which are incorporated herein by reference in their entireties.

BACKGROUND

1. Field

Methods and apparatuses consistent with example embodiments relate to a optimizing synthetic conditions for synthesizing chemical compounds to generate target products.

2. Description of the Related Art

A neural network may refer to a computing architecture that models a biological brain. As the neural network advances, electronic devices used in various fields may use a neural network-based model to analyze input data and extract and/or output valid information.

For example, synthesizing one or more compounds to execute chemical reactions to obtain a target product may involve numerous experiments performed by a great number of human resources, and the stability of synthetic conditions obtained from the results of these experiments may not be readily identifiable. Thus, there is a desire for a technology for reducing the number of times of synthesis experiments and obtaining a high yield of target products using a neural network-based model.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of various example embodiments, there is provided a method of optimizing synthetic conditions, the method including receiving a graph-type descriptor including at least one of structural information of at least one reactant and structural information of a target product to be synthesized by the reactant, determining combinations of synthetic conditions for generating the target product by applying the graph-type descriptor to a prediction neural network model, selecting at least one initial condition combination from among the combinations based on a first confidence corresponding to a yield of the combinations, updating the prediction neural network model based on a ground-truth yield obtained from a result of an experiment with the initial condition combination, determining a priority of the combinations based on the updated prediction neural network model, and determining subsequent combinations of synthetic conditions based on the determined priority.

The selecting of the initial condition combination may include determining a selection ratio for the initial condition combination based on the first confidence and selecting the initial condition combination based on the selection ratio.

The determining of the selection ratio may include determining the selection ratio including a first ratio by which synthetic conditions predicted by the prediction neural network model are selected to be the initial condition combination and a second ratio by which random conditions are selected to be the initial condition combination, based on the first confidence.

The determining of the selection ratio may include increasing the first ratio and decreasing the second ratio when the first confidence is greater than a preset threshold, and increasing the second ratio and decreasing the first ratio when the first confidence is less than the preset threshold.

The prediction neural network model may be trained to predict at least one of the combinations, predicted yields corresponding to the combinations, and the first confidence corresponding to the predicted yields.

The prediction neural network model may use a message passing neural network (MPNN) configured to determine the combinations according to a correlation between neighboring atoms in the reactant based on the graph-type descriptor.

The updating of the prediction neural network model may include updating the prediction neural network model based on a result of comparing a predicted yield corresponding to a combination of synthetic conditions determined by the prediction neural network model and the ground-truth yield.

The determining of the priority may include comparing a first yield corresponding to a combination of synthetic conditions predicted by the prediction neural network model yet to be updated and a second yield corresponding to a combination of synthetic conditions predicted by the updated prediction neural network model, and determining a priority between the combinations based on a result of the comparing.

The determining of the priority between the combinations based on the result of the comparing may include determining a first combination corresponding to the first yield to have a higher priority and determining a second combination corresponding to the second yield to have a lower priority when the second yield is less than or equal to the first yield, and determining the second combination to have the higher priority and the first combination to have the lower priority when the second yield is greater than the first yield.

The determining of the subsequent combinations of the synthetic conditions may include redetermining the priority as the prediction neural network model is updated based on a ground-truth yield obtained from a result of an experiment with the subsequent combinations of the synthetic conditions, determining next subsequent combinations of synthetic conditions that follow the subsequent combinations based on the redetermined priority, and iteratively performing the redetermining of the priority and the determining of the next subsequent combinations until a ground-truth yield obtained from a result of an experiment with the next subsequent combinations satisfies a preset target yield.

The synthetic conditions may include at least one of a catalyst condition, a ligand condition, a base condition, a solvent condition, a temperature condition, a density condition, a humidity condition, a reaction time condition, and a pressure condition.

The graph-type descriptor further may include a synthetic path including at least one of substituents and reactors of the reactant.

The determining of the combinations of the synthetic conditions may include determining the combinations of the synthetic conditions to satisfy a reaction mechanism of the reactant by applying the graph-type descriptor to the prediction neural network model.

According to another aspect of various example embodiments, there is provided a method of optimizing synthetic conditions, the method including receiving a graph-type descriptor including structural information of at least one reactant and structural information of a target product to be synthesized by the reactant, and a synthetic path of the reactant, and receiving a reaction mechanism of the reactant, determining a search space including combinations of synthetic conditions for generating the target product and the synthetic path that satisfy the reaction mechanism by applying the graph-type descriptor to a prediction neural network model, sampling at least one initial condition combination among the combinations based on a first confidence corresponding to a yield of the combinations in the search space, updating the prediction neural network model based on a ground-truth yield obtained from a result of an experiment with the initial condition combination, determining a priority of the combinations based on the updated prediction neural network model, and redetermining the search space such that it includes subsequent combinations of synthetic conditions and a subsequent synthetic path based on the determined priority. As the prediction neural network model is updated based on a result of an experiment with the subsequent combinations, the priority may be redetermined, and the search space may be determined to include next subsequent combinations of synthetic conditions that follow the subsequent combinations based on the redetermined priority.

The sampling of the initial condition combination may include determining a selection ratio including a first ratio by which synthetic conditions predicted by the prediction neural network model are selected to be the initial condition combination and a second ratio by which random conditions are selected to be the initial condition combination, based on the first confidence.

The determining of the selection ratio may include increasing the first ratio and decreasing the second ratio when the first confidence is greater than a preset threshold, and increasing the second ratio and decreasing the first ratio when the first confidence is less than the preset threshold.

The prediction neural network model may be trained to predict at least one of the combinations, predicted yields corresponding to the combinations, the first confidence corresponding to the predicted yields, and the synthetic path, which satisfy the reaction mechanism.

The updating of the prediction neural network model may include updating the prediction neural network model based on a result of comparing a predicted yield corresponding to a combination of synthetic conditions determined by the prediction neural network model and the ground-truth yield obtained from the result of the experiment with the initial condition combination.

The determining of the priority may include comparing a first yield corresponding to a combination of synthetic conditions predicted by the prediction neural network model yet to be updated and a second yield corresponding to a combination of synthetic conditions predicted by the updated prediction neural network model, determining a first combination corresponding to the first yield to have a higher priority and determining a second combination corresponding to the second yield to have a lower priority when the second yield is less than or equal to the first yield, and determining the second combination to have the higher priority and the first combination to be the lower priority when the second yield is greater than the first yield.

According to still another aspect of various example embodiments, there is provided an apparatus for optimizing synthetic conditions, the apparatus including a user interface (UI) configured to receive a graph-type descriptor including at least one of structural information of at least one reactant and structural information of a target product to be synthesized by the reactant, a memory in which at least one program is stored, and a processor configured to operate a neural network by executing the program. The processor may determine combinations of synthetic conditions for generating the target product by applying the graph-type descriptor to a prediction neural network model based on the neural network, select at least one initial condition combination from among the combinations based on a first confidence corresponding to a yield of the combinations, update the prediction neural network model based on a ground-truth yield obtained from a result of an experiment with the initial condition combination, determine a priority of the combinations based on the updated predicted model, and determine subsequent combinations of synthetic conditions based on the determined priority. The processor may determine a selection ratio for the initial condition combination based on the first confidence, and select the initial condition combination based on the determined selection ratio.

The processor may determine the selection ratio including a first ratio by which synthetic conditions predicted by the prediction neural network model are selected to be the initial condition combination and a second ratio by which random conditions are selected to be the initial condition combination, based on the first confidence.

The processor may increase the first ratio and decrease the second ratio when the first confidence is greater than a preset threshold, and increase the second ratio and decrease the first ratio when the first confidence is less than the preset threshold.

The prediction neural network model may be trained to predict at least one of the combinations, predicted yields corresponding to the combinations, and the first confidence corresponding to the predicted yields.

The prediction neural network model may use an MPNN configured to determine the combinations according to a correlation between neighboring atoms in the reactant based on the graph-type descriptor.

The processor may update the prediction neural network model based on a result of comparing a predicted yield of a combination of synthetic conditions determined by the prediction neural network model and the ground-truth yield.

The processor may compare a first yield corresponding to a combination of synthetic conditions predicted by the prediction neural network model yet to be updated and a second yield corresponding to a combination of synthetic conditions predicted by the updated prediction neural network model, and determine a priority between the combinations based on a result of the comparing.

The processor may determine a first combination corresponding to the first yield to have a higher priority and determine a second combination corresponding to the second yield to have a lower priority when the second yield is less than or equal to the first yield, and determine the second combination to have the upper priority and the first combination to be the lower priority when the second yield is greater than the first yield.

The processor may redetermine the priority as the prediction neural network model is updated based on a ground-truth yield obtained from a result of an experiment with the subsequent combinations of the synthetic conditions, determine next subsequent combinations of synthetic conditions based on the redetermined priority, and iteratively perform the redetermining of the priority and the determining of the next subsequent combinations until a ground-truth yield obtained from a result of an experiment with the next subsequent combinations satisfies a preset target yield.

The synthetic conditions may include at least one of a catalyst condition, a ligand condition, a base condition, a solvent condition, a temperature condition, a density condition, a humidity condition, a reaction time condition, and a pressure condition.

The graph-type descriptor may further include a reaction mechanism of the reactant.

The processor may determine the combinations of the synthetic conditions to satisfy a reaction mechanism of the reactant by applying the graph-type descriptor to the prediction neural network model.

According to yet another aspect of various example embodiments, there is provided an apparatus for optimizing synthetic conditions, the apparatus including a UI configured to receive a graph-type descriptor including structural information of at least one reactant, structural information of a target product to be synthesized by the reactant, and a synthetic path including at least one of substituents and reactors of the reactant, and receive a reaction mechanism of the reactant, a memory in which at least one program is stored, and a processor configured to operate a neural network by executing the program. The processor may determine a search space including combinations of synthetic conditions for generating the target product and a synthetic path, which satisfy the reaction mechanism, by applying the graph-type descriptor to a prediction neural network model based on the neural network, sample at least one initial condition combination among the combinations based on a first confidence corresponding to a yield of the combinations in the search space, update the prediction neural network model based on a ground-truth yield obtained from a result of an experiment with the initial condition combination, determine a priority of the combinations based on the updated prediction neural network model, and redetermine the search space such that it includes subsequent combinations of synthetic conditions based on the determined priority. Here, as the prediction neural network model is updated based on a ground-truth yield obtained from a result of an experiment with the subsequent combinations of the synthetic conditions, the priority may be redetermined, and the search space may be determined such that it includes next subsequent combinations of synthetic conditions based on the redetermined priority.

The prediction neural network model may be trained to predict at least one of the combinations, predicted yields corresponding to the combinations, the first confidence corresponding to the predicted yields, and the synthetic path, which satisfy the reaction mechanism.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
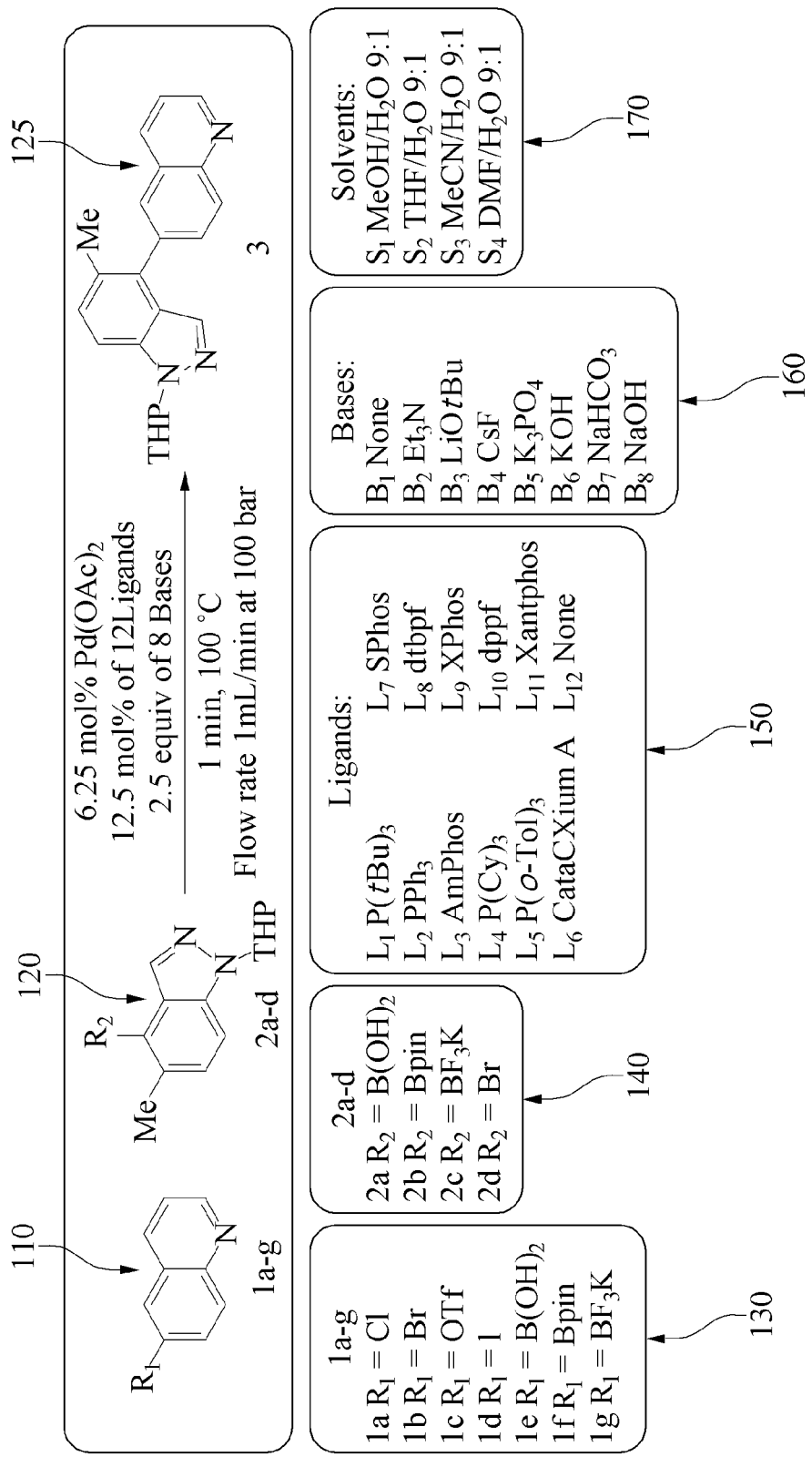
FIG. 1 is a diagram illustrating an example of a reactant, a target product, a synthetic path, synthetic conditions, and a reaction mechanism according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating an example of a reactant, a target product, synthetic paths, synthetic conditions, and a reaction mechanism according to an example embodiment. Referring to FIG. 1, reactants 110 and 120, a target product 125, synthetic paths 130 and 140, synthetic conditions 150, 160, and 170, and a reaction mechanism are illustrated.

The term "reactant(s)" refers to a material or substance participating in a chemical reaction, and the term "product(s)" refers to a material or substance generated as the result of the chemical reaction or chemical synthesis. That is, a material or substance reacting when it changes into another material or substance through a chemical reaction may be referred to as a reactant(s), and a material or substance changed or newly generated through the chemical reaction may be referred to as a product(s).

The term "target product" may be a product targeted to be generated through a chemical reaction of a reactant(s). The target product may also be referred to as a target compound.

For example, as illustrated, the target product 125 may be generated through a synthesis of the reactants 110 and 120. In this example, the target product 125 may be a known or unknown material or substance.

For a synthesis of reactants to generate a target product, conditions including, for example, a catalyst condition (e.g., a catalyst of 6.25 mol % $Pd(OAc)_2$), a ligand condition (e.g., 12 ligands of 12.5 mol %), and a base condition (e.g., 2.5 equivalents of 8 bases), and also a temperature condition (e.g., 100° C.), a reaction time condition (e.g., 1 minute (min)), and a pressure condition (e.g., a flow rate of 1 mL/min at 100 bar), may be applied.

For example, for the synthesis of the reactants 110 and 120, various synthetic conditions such as a catalyst condition, a ligand condition 150, a base condition 160, a solvent condition 170, a temperature condition, a density condition, a humidity condition, a reaction time condition, a pressure condition, and the like may be applied, but examples of which are not limited thereto. Among these synthetic conditions, the catalyst condition, the ligand condition 150, the base condition 160, and the solvent condition 170 may be collectively referred to as a reagent condition.

A product may change according to synthetic conditions applied to the synthesis of the reactants 110 and 120. In other words, if the synthetic conditions change, the resulting product may change. A ligand used herein may correspond to a specific substitute or specific moiety in a molecule responsible for a characteristic chemical reaction of molecules in organic chemistry. The ligand may be an atom or a group of atoms that forms a coordinate bond while donating an electron pair to a central metal atom in a substance or complex compound that specifically binds to a specific site (or a ligand binding site) in a large molecule such as a receptor, for example. The ligand may also be referred to as a functional group in that it is a group of atoms with characteristic chemical behavior.

The synthetic conditions may be various conditions set to perform an experiment for generating the target product 125 using the reactants 110 and 120. The synthetic conditions may be determined in various ways according to a reaction mechanism.

The reaction mechanism used herein may refer to a chemical reaction method for generating a target product using a reactant(s) to be synthesized. The reaction mechanism may include, for example, a Suzuki-Miyaura reaction, a Buchwald-Hartwig reaction, and an arylation reaction, but is not limited thereto. For example, generating a target product, for example, halide (R2-BY2), using a reactant, for example, organoboron (R1-BY2), may involve a reaction mechanism, for example, the Suzuki-Miyaura reaction. The reaction mechanism may be provided as a plurality of reaction mechanisms based on structural information of a reactant(s) and structural information of a target product, for example, A molecular structure+B molecular structure=C molecular structure. A structure used herein may refer to an atomic-level structure of a substance or material. The structure may indicate a structural formula based on a bond between atoms.

In addition to the synthetic conditions described above, various synthetic paths (e.g., synthetic paths 130 and 140) may be suggested. The synthetic paths may be another target to be optimized and may be optimized along with the synthetic conditions.

The synthetic paths may include, for example, at least one of substitutes 130 and reactors 140 of the reactants 110 and 120.

A substitute(s) used herein may correspond to, for example, an atom or a group of atoms substituting one or more hydrogen atoms (R1) on a parent chain of hydrocarbon in organic chemistry and/or biochemistry. For example, when one hydrogen (H) atom in benzene ($C_6H_6$) is substituted with a chlorine (Cl) atom, it may become chlorobenzene ($C_6H_5C_1$). When one hydrogen (H) atom of benzene ($C_6H_6$) is substituted with a nitro group ($NO_2$), it may become nitrobenzene ($C_6H_5NO_2$). In this example, the chlorine atom and the nitro group substituted with one hydrogen atom may correspond to substituents.

A reactor(s) used herein may correspond to a starting material or substance for generating a target product.

In general, a great amount of cost for reagents, a great amount of time for experiments, and a great number of human resources may be required to obtain a target product.

In an example, optimal combinations of synthetic conditions for synthesizing a target product with a high yield may be obtained using a neural network-based prediction model, the reactors 140 may be predicted, and/or a search space including the synthetic conditions 150, 160, and 170, and the synthetic paths 130 and 140 may be determined. The yield of the chemical synthesis process may be represented by a reaction yield indicating the quantity of the target product formed in relation to the reactant consumed, a conversion rate indicating an amount of a reactant that has reacted in relation to the total reactant, and/or a selectivity rate indicating a ratio of the quantity of the (desired) target product to the amount of an undesired target product that is formed as a result of the chemical synthesis process.

In addition, a synthetic path(s) may be classified as a target for a synthetic condition, and various synthetic paths may be searched in conjunction with the prediction model. In an example, the prediction model may be updated based on a difference between an actual yield (e.g., a ground-truth yield) measured from a result of an experiment performed with an initial condition combination and a predicted yield of the prediction model, and a priority among the combinations of the synthetic conditions may be determined. Based on the determined priority, a search space including subsequent combinations of synthetic conditions and synthetic paths for a subsequent experiment may be iteratively redetermined. Thus, a combination of synthetic conditions and a synthetic path from deriving an optimal yield may be obtained.

Figure 2:
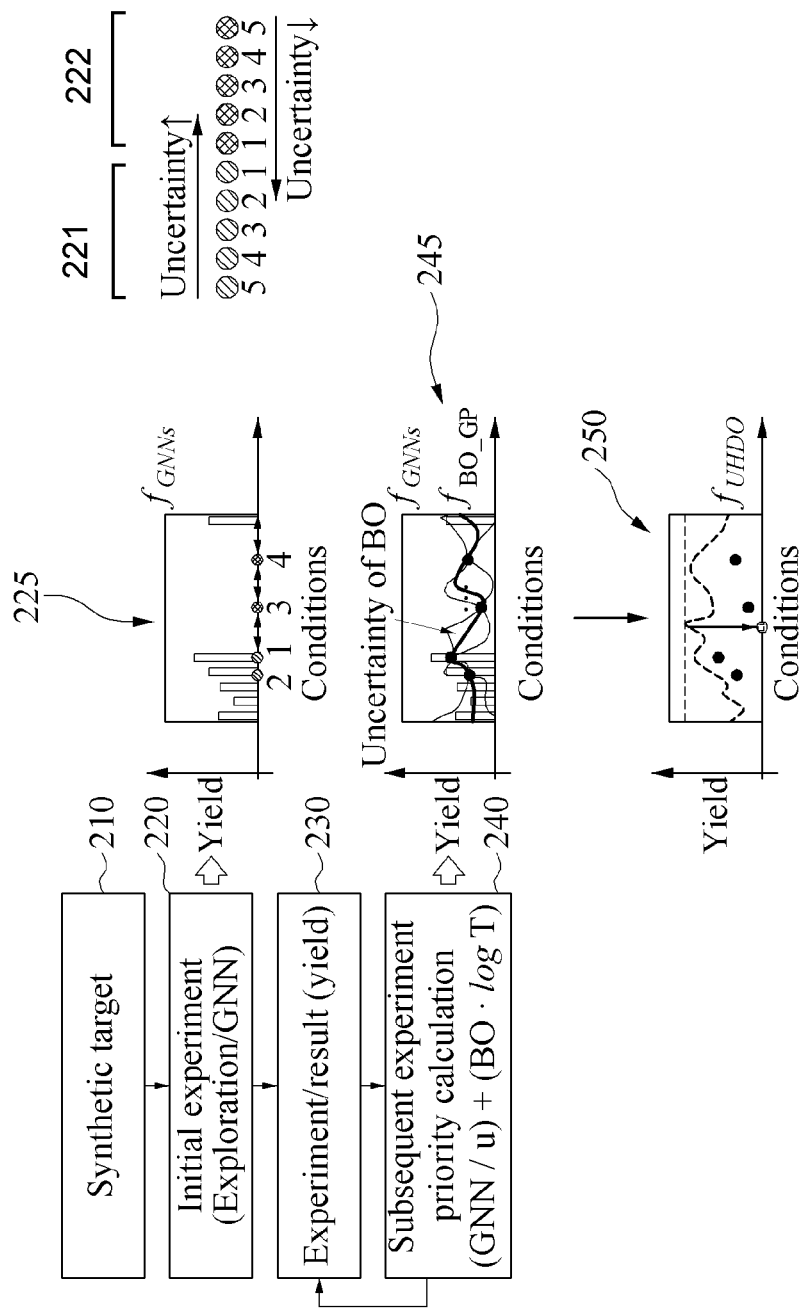
FIG. 2 is a diagram illustrating a conceptual example of a method of optimizing synthetic conditions according to an example embodiment.

FIG. 2 is a diagram illustrating a conceptual example of a method of optimizing synthetic conditions according to an example embodiment. Referring to FIG. 2, an apparatus for optimizing synthetic conditions (hereinafter simply an "optimizing apparatus") may optimize synthetic conditions.

In the related art, a fixed number of initial experiments (e.g., initial 10 experiments) may be conducted by randomly combining conditions or by human knowledge, in order to find an optimal combination of conditions. According to an embodiment of the disclosure, the initial experiment may be conducted using a certain number of condition combinations recommended by the prediction model, and the number of trials of the condition combinations predicted by machine learning may be adjusted according to the reliability of the predictive model. For example, when the reliability of the predictive model is high, all preset number of experiments (e.g., 10 experiments) may be conducted with confidence in the results of the predictive model. When the reliability of the predictive model is low, the number of experiments may be adjusted to be lower such that the optimal combination of conditions can be found more quickly.

In operation 210, the optimizing apparatus may receive a synthetic target to be synthesized. The synthetic target may be, for example, an image, a graph-type descriptor including three-dimensional (3D) structural information of at least one reactant and 3D structural information of a target product to be synthesized by the reactant, or a graph-type descriptor including 3D structural information of a target product. However, examples of the synthetic target are not limited to the foregoing example. The synthetic target may further include a synthetic path or may correspond to a search space including a combination of synthetic conditions and a synthetic path.

In operation 220, the optimizing apparatus may perform an initial experiment by selecting an initial condition combination 225 based on combinations of synthetic conditions predicted by a prediction (neural network) model trained in advance for the synthetic target received in operation 210. For example, the optimizing apparatus may perform the initial experiment by selecting a plurality of initial condition combinations (e.g., 10 initial condition combinations) to be used for the initial experiment based on the combinations of the synthetic conditions 222 predicted by the prediction model (which follows synthesis conditions 221 found through exploration), yields respectively corresponding to the combinations, and a confidence corresponding to the yields. An initial condition combination used herein may correspond to a group of combinations of synthetic conditions to be applied to an initial experiment for synthesizing a target product, or a group of the synthetic conditions.

The prediction model may be trained through data-based machine learning that stores and/or processes one million or more optimized conditions cited in, for example, scientific papers and patents, in the form of a database. The prediction model may output the combinations of the synthetic conditions for the target product by receiving the descriptor in operation 210. An example of the prediction model will be described in detail with reference to FIG. 4.

The prediction model may predict a score corresponding to data (e.g., combinations of synthetic conditions) used for training, and the optimizing apparatus may perform the initial experiment using 10 sets of data with highest scores among sets of data, that is, sets of data with highest yields.

The prediction model may predict combinations of synthetic conditions. However, for relatively uncommon experimental data, the prediction model may predict an uncertain combination of synthetic conditions. Thus, the optimizing apparatus may output both a predicted result (e.g., combinations of synthetic conditions and yields corresponding to the combinations of the synthetic conditions) of the prediction model and a confidence (e.g., a first confidence) corresponding to the predicted result, and use the predicted result by a predetermined ratio based on the confidence.

For example, under the assumption that combinations of 10 synthetic conditions are used for the initial experiment, the optimizing apparatus may select at least one initial condition combination to be used for the experiment from among 10 sets of data based on the predicted result and the confidence. In this example, when the first confidence corresponding to the predicted result of the prediction model is high (or higher than a preset confidence level), selecting combinations of synthetic conditions predicted by the prediction model for all ten times may be effective in terms of optimization efficiency. In contrast, when the first confidence corresponding to the predicted result of the prediction model is low (or lower than or equal to the preset confidence level), performing the experiment with the synthetic conditions predicted by the prediction model for all ten times may not be desirable, and thus using different synthetic conditions for some of the ten times may be desirable.

The first confidence may also be referred to as an uncertainty of the prediction model in that it indicates whether a predicted result of the prediction model is certain or uncertain. Hereinafter, the first confidence, the uncertainty, and a confidence corresponding to a yield will be interchangeably used.

In operation 220, the optimizing apparatus may select a combination of synthetic conditions predicted by the prediction model by a first ratio (e.g., a mixing ratio of chemical components) from among 10 synthetic conditions to be used for the initial experiment, or select a new combination of synthetic conditions by a second ratio (e.g., another mixing ratio of chemical components), based on the first confidence. For example, when a predicted result of the prediction model is uncertain, that is, when the first confidence is determined to be less than a preset threshold, the optimizing apparatus may decrease the first ratio of the combination of the synthetic conditions predicted by the prediction model among the combinations of the 10 synthetic conditions to be used in the initial experiment, and increase the second ratio of the new combination of the synthetic conditions different from the combination of the synthetic conditions predicted by the prediction model among the combinations of the 10 synthetic conditions. Conversely, when the predicted result of the prediction model is certain, that is, the first confidence is determined to be greater than the preset threshold, the optimizing apparatus may increase the first ratio of the combination of the synthetic conditions predicted by the prediction model among the combinations of the 10 synthetic conditions, and decrease the second ratio of the new combination of the synthetic conditions among the combinations of the 10 synthetic conditions.

In operation 230, the optimizing apparatus may obtain an actual yield from a result of the experiment performed with the 10 initial condition combinations selected in operation 220.

In operation 240, the optimizing apparatus may calculate a priority among combinations of synthetic conditions for a subsequent experiment, i.e., subsequent combinations of synthetic conditions, based on the actual yield obtained in operation 230. The optimizing apparatus may optimize the combinations of the synthetic conditions for the subsequent experiment by verifying a difference between the actual yield obtained through the experiment and a predicted yield of the prediction model.

In operation 240, the optimizing apparatus may rapidly find an optimal combination of synthetic conditions with a high yield, using both a combination of synthetic conditions obtained by the prediction model using known data and a combination of synthetic conditions obtained through Bayesian optimization using an actual experiment result.

The optimizing apparatus may determine the priority among the subsequent combinations of the synthetic conditions (or the combinations of the synthetic conditions for the subsequent experiment) as illustrated in a graph 250 through a comprehensive determination made based on a yield (indicated as a graph neural network (GNN)) predicted by the prediction model trained with data, an uncertainty (u) of the prediction model, a yield (indicated as BO) calculated through a yield inference method such as Bayesian optimization that is based on an actual experiment result, and the number of iterations (T) as illustrated in a graph 245. In this case, the prediction model may be updated based on the actual yield from the result of the experiment performed with the subsequent combinations of the synthetic conditions and the priority may thereby be redetermined, and then next subsequent combinations of synthetic conditions that follow the subsequent combinations may be determined based on the redetermined priority and the priority among the next subsequent combinations may be determined. The priority may be iteratively determined in such a way.

When an actual yield obtained according to the redetermined priority does not reach a target yield, the optimizing apparatus may iteratively perform operations 230 and 240 by feeding the actual yield back. When the actual yield obtained according to the redetermined priority reaches or exceeds the target yield, the optimizing apparatus may end the operations.

Figure 3:
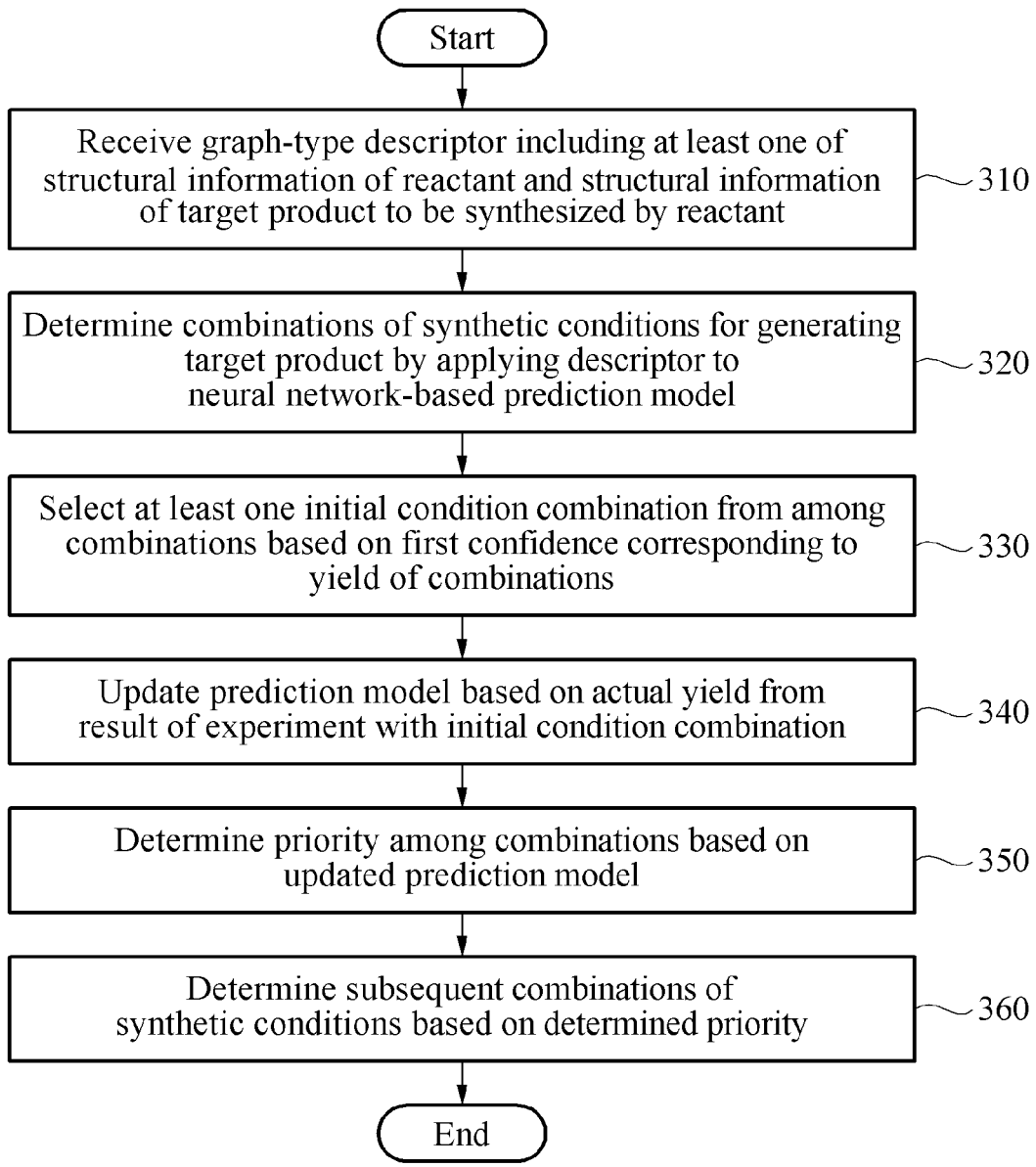
FIG. 3 is a flowchart illustrating an example of a method of optimizing synthetic conditions according to an example embodiment.

FIG. 3 is a flowchart illustrating an example of a method of optimizing synthetic conditions according to an example embodiment. Operations to be described hereinafter may be performed in sequential order, but not be necessarily performed in sequential order. For example, the order of the operations may change, and at least two of the operations may be performed in parallel.

Referring to FIG. 3, the optimizing apparatus may perform operations 310 through 360 to optimize synthetic conditions for generating a target product.

According to an example embodiment, the optimizing apparatus may be implemented as one of the various types of apparatuses or devices, for example, a personal computer (PC), a server device, a mobile device, an embedded device, and the like. In more detail, the optimizing apparatus may be, as a non-limiting example, a smartphone, a tablet device, an augmented reality (AR) device, an Internet of things (IoT) device, an autonomous vehicle, a robot, a medical device, or the like, which performs speech recognition, image recognition, image classification, and the like using a neural network. Alternatively, the optimizing apparatus may correspond to a dedicated hardware (HW) accelerator provided to the foregoing apparatuses or devices, or to an HW accelerator such as a neural processing unit (NPU), a tensor processing unit (TPU), and a neural engine which are a dedicated module for operating a neural network. However, examples of the optimizing apparatus are not limited to the foregoing.

In operation 310, the optimizing apparatus may receive a graph-type descriptor including at least one of structural information of at least one reactant and structural information of a target product to be synthesized by the reactant. The structural information of the reactant and the structural information of the target product may correspond to 3D structural information. Structural information used herein, an indicator used to represent a structure of a substance or material, may represent a structural feature value indicating whether a structure of a specific part is included. The graph-type descriptor may further include a synthetic path including at least one of substituents and reactors of the reactant.

Figure 11:
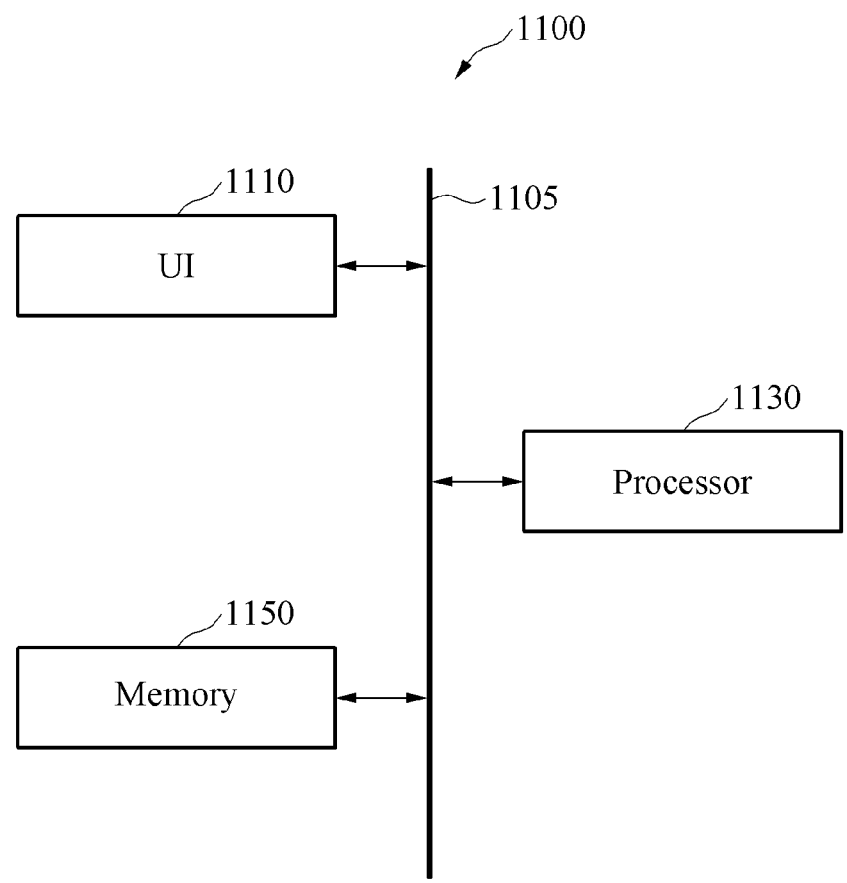
FIG. 11 is a diagram illustrating an example of an apparatus for optimizing synthetic conditions according to an example embodiment.

The optimizing apparatus may receive at least one of the structural information of the reactant and the structural information of the target product through a user interface (UI) (e.g., a UI 1110 of FIG. 11).

That is, the optimizing apparatus may receive the structural information of the reactant and the structural information of the target product in the form of a graph-type descriptor. A descriptor used herein may correspond to an indicator value used to represent features of a material or substance such as a reactant and/or a product.

According to an example embodiment, the optimizing apparatus may also receive a reaction mechanism for generating a target product through a reactant(s). The optimizing apparatus may receive the reaction mechanism in the form of a one-hot vector. For example, when the optimizing apparatus receives a second reaction mechanism among four reaction mechanisms, a one-hot vector received by the optimizing apparatus may be represented as 0100.

In operation 320, the optimizing apparatus may determine combinations of synthetic conditions for generating the target product by applying the descriptor to a neural network-based prediction model. A combination(s) of synthetic conditions used herein may be used to obtain an optimal yield and may correspond to a combination of conditions included in each synthetic condition. According to an example embodiment, the optimizing apparatus may generate the combinations of the synthetic conditions based on the structural information of the reactant and the structural information of the target product. The prediction model may output the combinations of the synthetic conditions for generating the target product by receiving the descriptor. In this case, a neural network may include a message-passing neural network (MPNN) that determines combinations of synthetic conditions based on a correlation between neighboring atoms in a reactant(s) based on a graph-type descriptor indicating a relationship including nodes and edges. The MPNN may be a neural network trained with a message-passing algorithm and a collecting procedure for calculating a function of an entire input graph among graph neural networks (GNNs) that are based on structural data of graphs.

In addition, the prediction model may use or store therein a predicted yield that is based on the structural information of the reactant, the structural information of the target product, the reaction mechanism, and the synthetic conditions, and a confidence corresponding to the predicted yield. The optimizing apparatus may adjust the prediction model by receiving the predicted yield and the confidence (e.g., a first confidence) corresponding to the predicted yield from the prediction model or receiving a user input as feedback. The prediction model may use or store therein the structural information of the reactant, the structural information of the target product, and the reaction mechanism.

According to another example embodiment, when receiving the reaction mechanism along with the structural information of the reactant, the structural information of the target product, the optimizing apparatus may generate combinations of synthetic conditions that satisfy the reaction mechanism. For example, when the received reaction mechanism corresponds to a Suzuki-Miyaura reaction, the optimizing apparatus may select a combination of synthetic conditions including a catalyst condition (e.g., a chemical species of nucleophile such as palladium) and a reaction time condition (e.g., 15 minutes (min)).

According to an example embodiment, the optimizing apparatus may set combinations of synthetic conditions such that a type of synthetic condition is common for the combinations of the synthetic conditions. For example, the optimizing apparatus may set a first combination of synthetic conditions to include a catalyst A and a reaction time of 10 minutes, and set a second combination of synthetic conditions to include a catalyst B and a reaction time of 20 minutes. In this example, the optimizing apparatus may set the combinations of the synthetic conditions such that the first combination of the synthetic conditions and the second combination of the synthetic conditions include the catalyst condition and the reaction time condition.

According to another example embodiment, the optimizing apparatus may set combinations of synthetic conditions such that at least one of types of synthetic conditions is different for the combinations of the synthetic conditions. For example, the optimizing apparatus may set a first combination of synthetic conditions to include a catalyst C and a reaction time of 30 minutes, and set a second combination of synthetic conditions to include a base D and a temperature of E° C. In this example, the optimizing apparatus may set the first combination of the synthetic conditions to include the catalyst condition and the reaction time condition, and set the second combination of the synthetic conditions to include the base condition and the temperature condition that are different from the types of the synthetic conditions included in the first combination of the synthetic conditions.

Alternatively, the optimizing apparatus may generate a synthetic condition group including combinations of synthetic conditions. The synthetic condition group may refer to a group of combinations of synthetic conditions for which an experiment priority needs to be determined. The optimizing apparatus may determine the experiment priority among the combinations of the synthetic conditions included in the synthetic condition group.

In operation 320, the optimizing apparatus may calculate a predicted yield of the target product corresponding to each of the combinations of the synthetic conditions and a first confidence corresponding to the predicted yield, using the neural network-based prediction model. The predicted yield used herein may refer to an expected value of a yield of a target product generated from a reactant(s) through an experiment performed on the reactant(s) using a reaction mechanism and a synthetic condition. The predicted yield may be calculated by the prediction model. The predicted yield may be different from an actual yield calculated from an actual experiment.

The prediction model may include a neural network trained to predict at least one of combinations of synthetic conditions, predicted yields corresponding to the combinations of the synthetic conditions, and a first confidence corresponding to the predicted yields. The first confidence may refer to an indicator indicating a degree of similarity of a predicted yield of a target product generated by a combination of synthetic conditions to an actual yield, and may also be referred to as prediction accuracy. The prediction model may store therein at least one synthetic condition corresponding to a reaction mechanism.

The prediction model may predict combinations of synthetic conditions. However, for relatively uncommon experimental data, the prediction model may predict an uncertain combination of synthetic conditions and may thus output a predicted result of the prediction model along with a corresponding confidence. Hereinafter, determining combinations of synthetic conditions by the optimizing apparatus will be described in more detail with reference to FIG. 4.

In operation 330, the optimizing apparatus may select at least one initial condition combination from among the combinations of the synthetic conditions based on the first confidence corresponding to the yield of the combinations determined in operation 320. The initial condition combination may be, for example, combinations of 10 to 20 synthetic conditions used for an initial experiment, but is not limited thereto.

The optimizing apparatus may determine a selection ratio for the initial condition combination based on the first confidence. The selection ratio may include a first ratio by which synthetic conditions predicted by the prediction model are selected to be the initial condition combination, and a second ratio by which random conditions are selected to be the initial condition combination, but examples of which are not limited thereto. The first ratio may also be referred to as an exploitation ratio in that synthetic conditions are selected based on optimal conditions known or cited by, for example, (scientific) papers and patents. The second ratio may also be referred to as an exploration ratio in that synthetic conditions are selected from among unknown random conditions or conditions different from the synthetic conditions corresponding to the first ratio.

When the first confidence is greater than a preset threshold, the optimizing apparatus may increase the first ratio and decrease the second ratio. When the first confidence is less than the preset threshold due to, for example, a lack of data and a new synthetic type, the optimizing apparatus may increase the second ratio and decrease the first ratio. Hereinafter, selecting an initial condition combination by the optimizing apparatus will be described in more detail with reference to FIG. 5.

In operation 340, the optimizing apparatus may update the prediction model based on an actual yield measured from a result of an experiment with the initial condition combination selected in operation 330. The optimizing apparatus may update the prediction model while optimizing the synthetic conditions by adjusting the selection ratio based on a result of comparing a predicted yield corresponding to a combination of synthetic conditions determined by the prediction model and the actual yield. When the predicted yield is greater than the actual yield, the optimizing apparatus may update the prediction model such that the combination of the synthetic conditions corresponding to the predicted yield is included by a greater proportion. In contrast, when the predicted yield is less than the actual yield, the optimizing apparatus may update the prediction module such that the combination of the synthetic conditions corresponding to the actual yield is included by a greater proportion.

In operation 350, the optimizing apparatus may determine a priority among the combinations of the synthetic conditions based on the prediction model updated in operation 340. The optimizing apparatus may determine a priority among subsequent combinations of synthetic conditions, or combinations of synthetic conditions for a subsequent experiment, based on a result of comparing a first yield corresponding to a combination of synthetic conditions predicted by the prediction model yet to be updated and a second yield corresponding to a combination of synthetic conditions predicted by the prediction model updated in operation 340.

The optimizing apparatus may calculate the priority (e.g., $f_{UHDO}$) among the subsequent combinations of the synthetic conditions using Equation 1, for example.

$$f_{UHDO} = \frac{GNN}{\text{uncertainty}} + BO \cdot \log T \quad \text{[Equation 1]}$$

In Equation 1, the parameter "GNN" denotes a predicted yield corresponding to a combination of synthetic conditions predicted by a GNN-based prediction model, and the parameter "uncertainty (u)" denotes an uncertainty of the prediction model. The uncertainty of the prediction model may be a confidence associated with the prediction model itself and may also be referred to as a second confidence.

The parameter "BO" denotes an actual yield corresponding to a synthetic condition optimized through Bayesian optimization formatted to a result of an actual experiment. The parameter "T" denotes the number of iterations.

When the prediction model is determined to be less confident, the optimizing apparatus may optimize combinations of synthetic conditions by assigning a higher weight to a Bayesian optimization result based on the actual experiment than a predicted result of the prediction model. For example, when a yield predicted by the prediction model is 30% and a target yield is 95%, the optimizing apparatus may determine the prediction model to be less confident. In this example, the optimizing apparatus may assign a higher weight to a combination of synthetic conditions formatted to a result of a current experiment by Bayesian optimization and may thus more rapidly find optimal combinations of synthetic conditions. Hereinafter, determining a priority by the optimizing apparatus will be described in more detail with reference to FIG. 6.

In operation 360, the optimizing apparatus may determine subsequent combinations of synthetic conditions based on the priority determined in operation 350.

In operation 360, the optimizing apparatus may redetermine the priority as the prediction model is updated based on an actual yield from a result of an experiment with the subsequent combinations of the synthetic conditions. The optimizing apparatus may determine next subsequent combinations of synthetic conditions based on the redetermined priority. The optimizing apparatus may iteratively perform the operation of redetermining the priority and the operation of determining next subsequent combinations of synthetic conditions until an actual yield from a result of an experiment with subsequent combinations of synthetic conditions satisfies a preset target yield. Hereinafter, determining subsequent combinations of synthetic conditions by the optimizing apparatus will be described in more detail with reference to FIG. 7.

Figure 4:
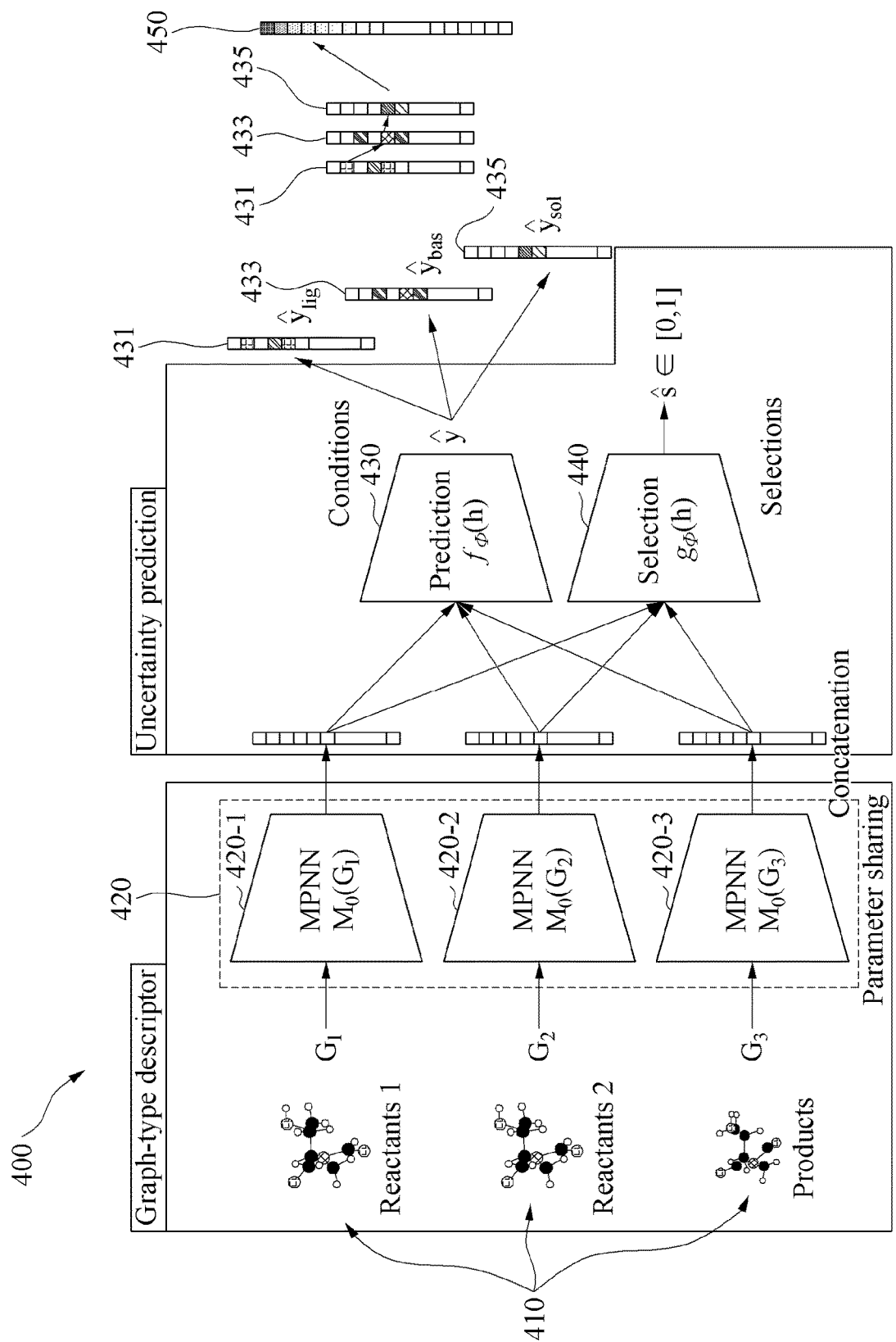
FIG. 4 is a diagram illustrating an example of determining combinations of synthetic conditions according to an example embodiment.

FIG. 4 is a diagram illustrating an example of determining combinations of synthetic conditions according to an example embodiment. Referring to FIG. 4, a first neural network 420 may receive graph-type descriptors $G_1$, $G_2$, and $G_3$ 410 and determine combinations of synthetic conditions for generating a target product, a second neural network 430 may output a predicted value $\hat{y}$ corresponding to the combinations of the synthetic conditions predicted by the first neural network 420, and a third neural network 440 may predict a tuning element § indicating whether a prediction model 400 is desirably trained. The third neural network 440 may be used to train the prediction model 400 and may not be included in an actual inference.

The first neural network 420 may include, for example, 1-1 neural network (e.g., MPNN $M_\theta(G_1)$) 420-1 configured to receive the descriptor $G_1$, 1-2 neural network (e.g., MPNN $M_\theta(G_2)$) 420-2 configured to receive the descriptor $G_2$, and 1-3 neural network (e.g., MPNN $M_\theta(G_3)$) 420-3 configured to receive the descriptor $G_3$. However, examples of the first neural network 420 are not limited to the foregoing. The descriptors $G_1$ and $G_2$ may be graph-type descriptors representing 3D structures of reactants for generating a target product, and the descriptor $G_3$ may correspond to a graph-type descriptor representing a 3D structure of the target product.

The first neural network 420 may extract features or feature vectors of synthetic conditions corresponding to each descriptor. The feature vectors of the synthetic conditions corresponding to each descriptor extracted by the first neural network 420 may be applied to the second neural network 430 and the third neural network 440. The second neural network 430 and the third neural network 440 may each be a fully-connected neural network including a plurality of layers.

The second neural network 430 may output a predicted value $\hat{y}$ corresponding to the feature vectors of the synthetic conditions corresponding to each descriptor. For example, the predicted value $\hat{y}$ may include combinations of synthetic conditions and uncertainties corresponding to the combinations. The predicted value $\hat{y}$ may include, for example, a vector 431 indicating a yield $\hat{y}_{lig}$ corresponding to a ligand, a vector 433 indicating a yield $\hat{y}_{bas}$ corresponding to a base condition, and a vector 435 indicating a yield $\hat{y}_{sol}$ corresponding to a solvent condition. However, the predicted value $\hat{y}$ is not limited to the foregoing. The vectors 431, 433, and 435 may represent, as a 10-dimensional vector, effective conditions for each of the synthetic conditions such as the ligand condition, the base condition, and the solvent condition, respectively. A vector corresponding to a darker color in the vectors 431, 433, and 435 may correspond to a more effective condition, i.e., a synthetic condition exhibiting a higher yield.

For example, the optimizing apparatus may select 20 vectors obtained by combining more effective conditions from the vectors 431, 433, and 435 to be combinations 450 of synthetic conditions. The combinations 450 of the synthetic conditions may be sequentially arranged according to an order starting with a highest yield corresponding to combinations of synthetic conditions.

The selecting of the combinations 450 of the synthetic conditions may correspond to setting a bias for a range of conditions to be optimized according to a corresponding reaction mechanism. This is because a type of synthetic condition may differ based on a reaction mechanism, and an element varying a yield may differ for each reaction mechanism.

In addition, the tuning element § output by the third neural network 440 may correspond to a value indicating whether the prediction model 400 is desirably trained. For example, the tuning element § may have a value of 1 when the prediction model 400 is desirably trained, and have a value of 0 when the prediction model 400 is not trained desirably.

Hereinafter, an example where descriptors corresponding to reactants and a target product are input to the first neural network 420 will be described for convenience of description, but examples are not limited to the foregoing example.

For example, for predicting the combinations 450 of the synthetic conditions for synthesizing the target product, the descriptors $G_1$, $G_2$, and $G_3$ may be input to the first neural network 420. In this example, the first neural network 420 may concatenate features of the synthetic conditions extracted from the descriptors $G_1$, $G_2$, and $G_3$ and output a result in the form of a vector. The first neural network 420 may share the same parameters. The first neural network 420 may include neural networks trained with a machine learning algorithm that learns data from scientific papers and the like and finally recommends an optimal condition for a specific reaction.

In contrast, for predicting combinations of synthetic conditions for synthetizing the target product and a synthetic path, the descriptor $G_3$ corresponding to the target product without the other descriptors corresponding to the reactants may be input to the first neural network 420. In this case, the second neural network 430 may output the combinations of the synthetic conditions corresponding to the reactants and synthetic paths for synthesizing the target product. Also, the second neural network 430 may classify the descriptors $G_1$ and $G_2$ of the reactants by the vectors 431, 433, and 435. In addition, the second neural network 430 may further output an uncertainty corresponding to a predicted value.

In an example, synthetic conditions for obtaining a high yield in an experiment for synthesizing a target product may be more effectively optimized based on machine learning, and a strategy for such optimization may be more flexibly changed by outputting both a predicted value and an uncertainty (or confidence) of the prediction model.

Figure 5:
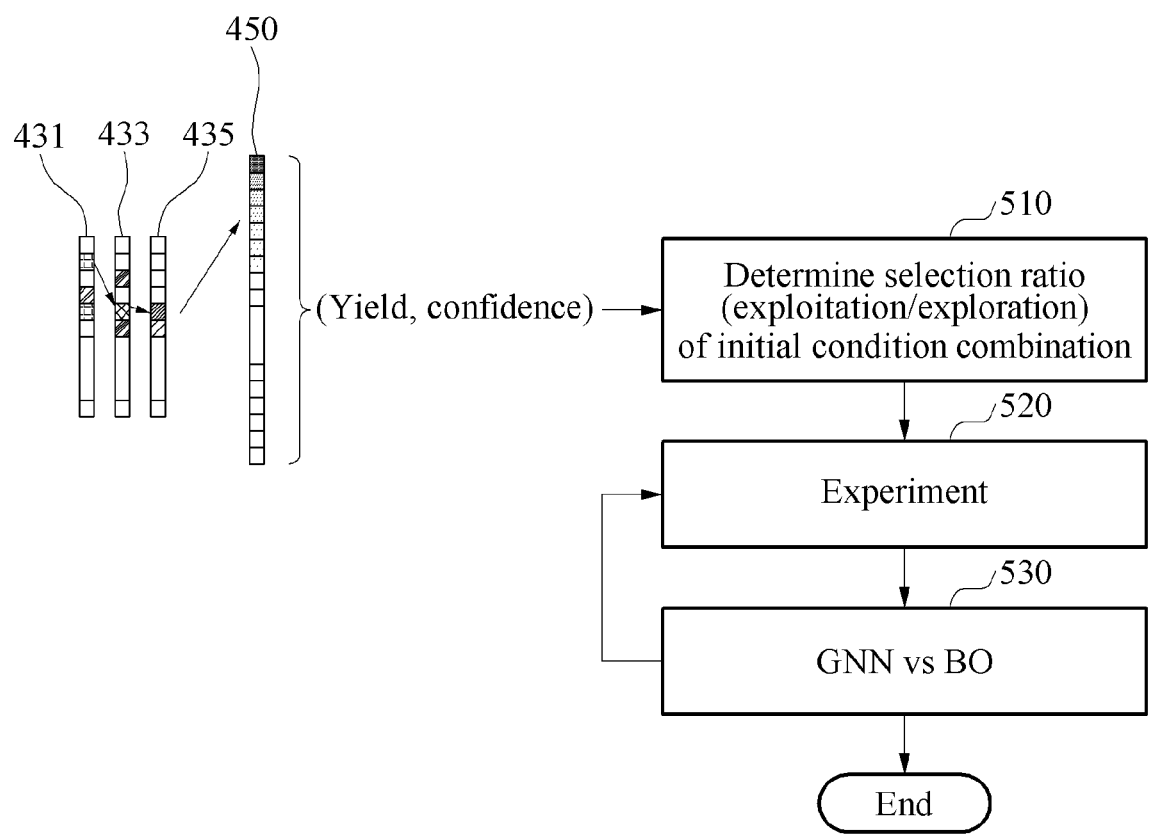
FIG. 5 is a diagram illustrating an example of selecting an initial condition combination according to an example embodiment.

FIG. 5 is a diagram illustrating an example of selecting an initial condition combination according to an example embodiment. Referring to FIG. 5, an initial condition combination may be selected based on a confidence (e.g., a first confidence) corresponding to a yield corresponding to combinations of synthetic conditions obtained as described above with reference to FIG. 4, and an experiment may then be performed based thereon.

As described above with reference to FIG. 4, the optimizing apparatus may select an initial condition combination from among the combinations 450 of the synthetic conditions, which are more effective conditions concatenated from the vector 431, the vector 433, and the vector 435.

The optimizing apparatus may predict 20 different vectors through a random dropout of connections of lines (e.g., edges) connecting layers in the second neural network 430 including the layers. That is, for example, the optimizing apparatus may connect some and disconnect some of layers outputting the vector 431, the vector 433, and the vector 435, to diversify the connections, and may thereby predict the 20 vectors corresponding to the initial condition combination among the combinations 450 of the synthetic conditions.

In this example, when a deviation among the 20 vectors is greater than a preset threshold, a first confidence (or uncertainty) corresponding to a predicted result of a prediction model may be determined to be low. In contrast, when the deviation among the 20 vectors is less than the preset threshold, the first confidence (or uncertainty) corresponding to the predicted result of the prediction model may be determined to be high.

In operation 510, the optimizing apparatus may determine a selection ratio of the initial condition combination among the combinations 450 of the synthetic conditions based on a confidence (or a first confidence) corresponding to a yield of the combinations 450 of the synthetic conditions. When selecting the initial condition combination, the optimizing apparatus may determine the selection ratio including a first ratio (exploitation) by which the initial condition combination is selected based on a predicted value of the prediction model and a second ratio (exploration) by which the initial condition combination is selected to include various conditions.

For example, when the first confidence is greater than a preset threshold, the optimizing apparatus may increase the first ratio and decrease the second ratio. In contrast, when the first confidence is less than the preset threshold due to, for example, a lack of data and a new synthetic type, the optimizing apparatus may increase the second ratio and decrease the first ratio.

The optimizing apparatus may provide a predicted value of the prediction model along with a corresponding confidence (or a first confidence) and determine the selection ratio of the initial condition combination based on the first confidence. When the first confidence is greater than the preset threshold because the initial condition combination corresponds to simple known synthetic conditions, the optimizing apparatus may increase the first ratio, compared to the second ratio, in the selection ratio of the initial condition combination to find a combination of synthetic conditions in early stages. In contrast, when the first confidence is less than the preset threshold due to, for example, a lack of data and a new synthetic type, the optimizing apparatus may increase the second ratio, compared to the first ratio, and adopt various conditions to synthesize a target product under sufficiently diversified conditions. The optimizing apparatus may select the initial condition combination based on the selection ratio.

In operation 520, the optimizing apparatus may perform an experiment based on the selection ratio of the initial condition combination determined in operation 510.

In operation 530, the optimizing apparatus may find an optimal combination of synthetic conditions with a high yield based on a difference between a predicted yield (indicated as GNN) corresponding to a predicted result of the prediction model and an actual yield (indicated as BO) corresponding to an optimization method formatted to a result of a current experiment by Bayesian optimization. The term "actual yield" may be also referred to a ground-truth yield. The optimizing apparatus may optimize combinations of synthetic conditions by assigning different weights to a combination of synthetic conditions corresponding to the predicted yield and a combination of synthetic conditions corresponding to the actual yield based on the difference between the predicted yield and the actual yield and the confidence of the prediction model, and adjusting a priority between the combinations of the synthetic conditions.

Figure 6:
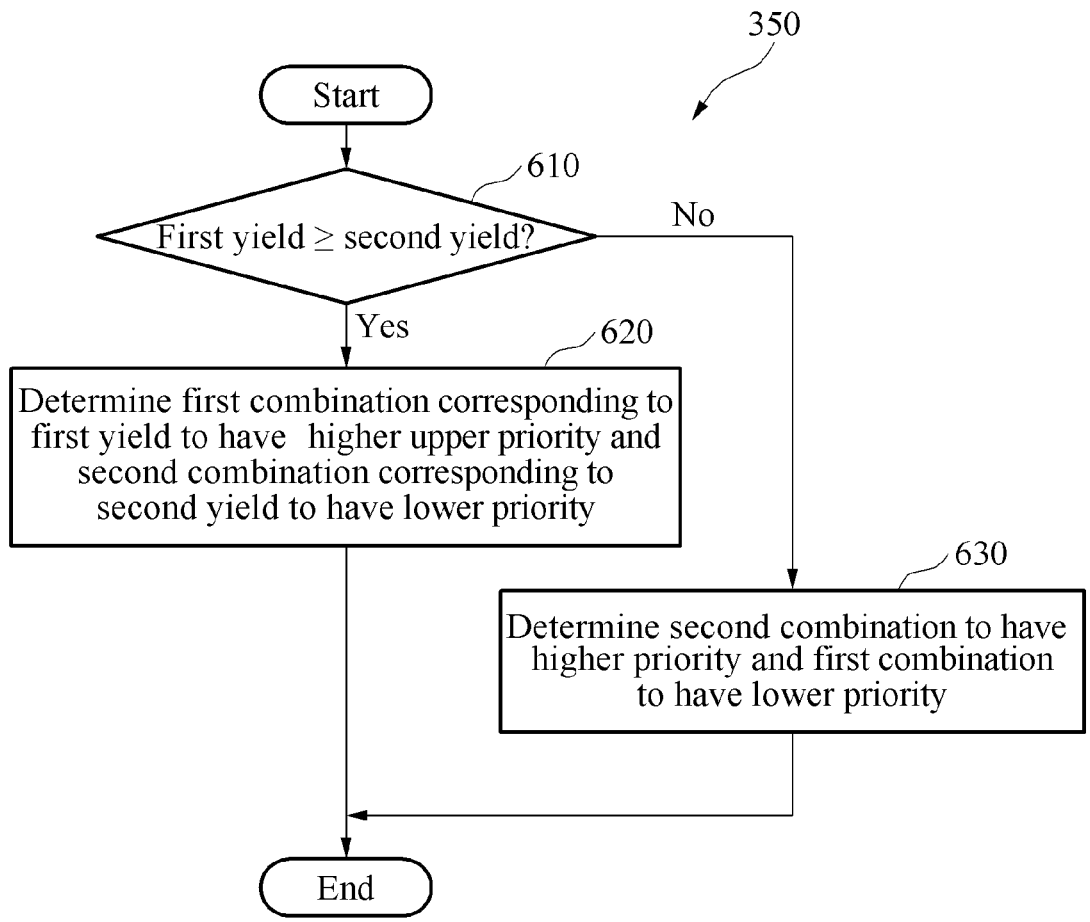
FIG. 6 is a flowchart illustrating an example of determining a priority of combinations according to an example embodiment.

FIG. 6 is a flowchart illustrating an example of determining a priority of combinations according to an example embodiment. Operations to be described hereinafter may be performed in sequential order, but not be necessarily performed in sequential order. For example, the order of the operations may change, and at least two of the operations may be performed in parallel.

The optimizing apparatus may determine a priority of combinations of synthetic conditions for a subsequent experiment based on a result of comparing a first yield corresponding to a combination of synthetic conditions predicted by a prediction model before being updated and a second yield corresponding to a combination of synthetic conditions predicted by a prediction model after being updated in operation 340 described above with reference to FIG. 3.

Referring to FIG. 6, the optimizing apparatus may determine a priority of combinations of synthetic conditions by performing operations 610 through 630 to be described hereinafter.

In operation 610, the optimizing apparatus may determine whether the second yield is less than or equal to the first yield. In operation 620, when the second yield is determined to be less than or equal to the first yield in operation 610, the optimizing apparatus may determine a first combination corresponding to the first yield to have a higher priority and may determine a second combination corresponding to the second yield to have a lower priority.

In operation 630, when the second yield is determined to be greater than the first yield in operation 610, the optimizing apparatus may determine the second combination to have the higher priority and the first combination to have the lower priority.

The optimizing apparatus may perform a subsequent experiment based on the determined priority.

Figure 7:
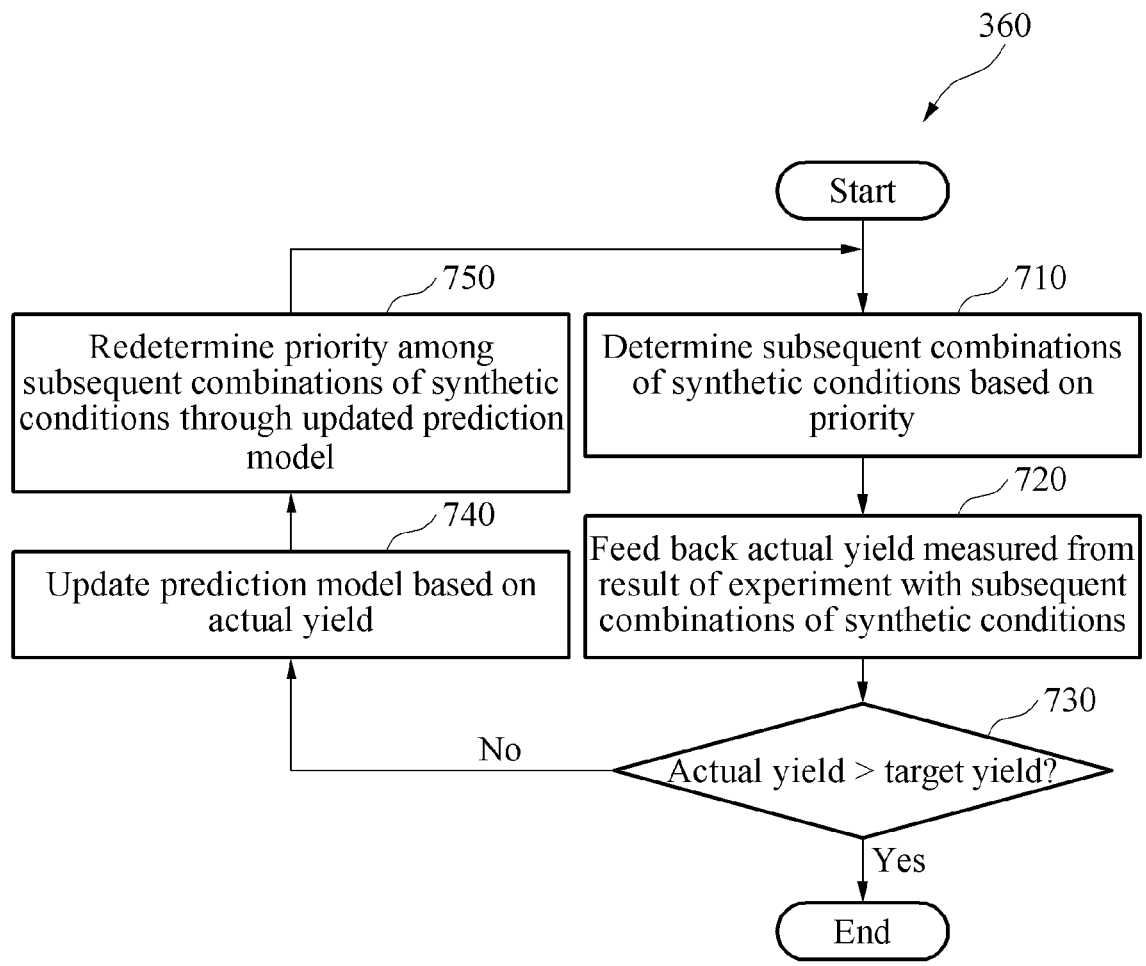
FIG. 7 is a flowchart illustrating an example of a method of determining subsequent combinations of synthetic conditions according to an example embodiment.

FIG. 7 is a flowchart illustrating an example of determining subsequent combinations of synthetic conditions according to an example embodiment. Operations to be described hereinafter may be performed in sequential order, but not be necessarily performed in sequential order. For example, the order of the operations may change, and at least two of the operations may be performed in parallel.

Referring to FIG. 7, the optimizing apparatus may determine subsequent combinations of synthetic conditions by performing operations 710 through 750 to be described hereinafter.

In operation 710, the optimizing apparatus may determine subsequent combinations of synthetic conditions based on a priority determined as described above with reference to FIG. 6. A subsequent combination(s) of synthetic conditions described herein may refer to a combination(s) of synthetic conditions for a subsequent experiment.

In operation 720, the optimizing apparatus may provide feedback on an actual yield measured from a result of an experiment performed with the subsequent combinations of the synthetic conditions determined in operation 710.

In operation 730, the optimizing apparatus may compare the actual yield fed back in operation 720 and a preset target yield. The optimizing apparatus may determine whether the actual yield is greater than the target yield. For example, when the actual yield is determined to be greater than the target yield in operation 730, the optimizing apparatus may end the operations.

In operation 740, when the actual yield is determined to be less than or equal to the target yield in operation 730, the optimizing apparatus may update a prediction model based on the actual yield.

In operation 750, the optimizing apparatus may redetermine the priority of the subsequent combinations of the synthetic conditions through the prediction model updated in operation 740. The optimizing apparatus may then perform operation 710 based on the redetermined priority.

Figure 8:
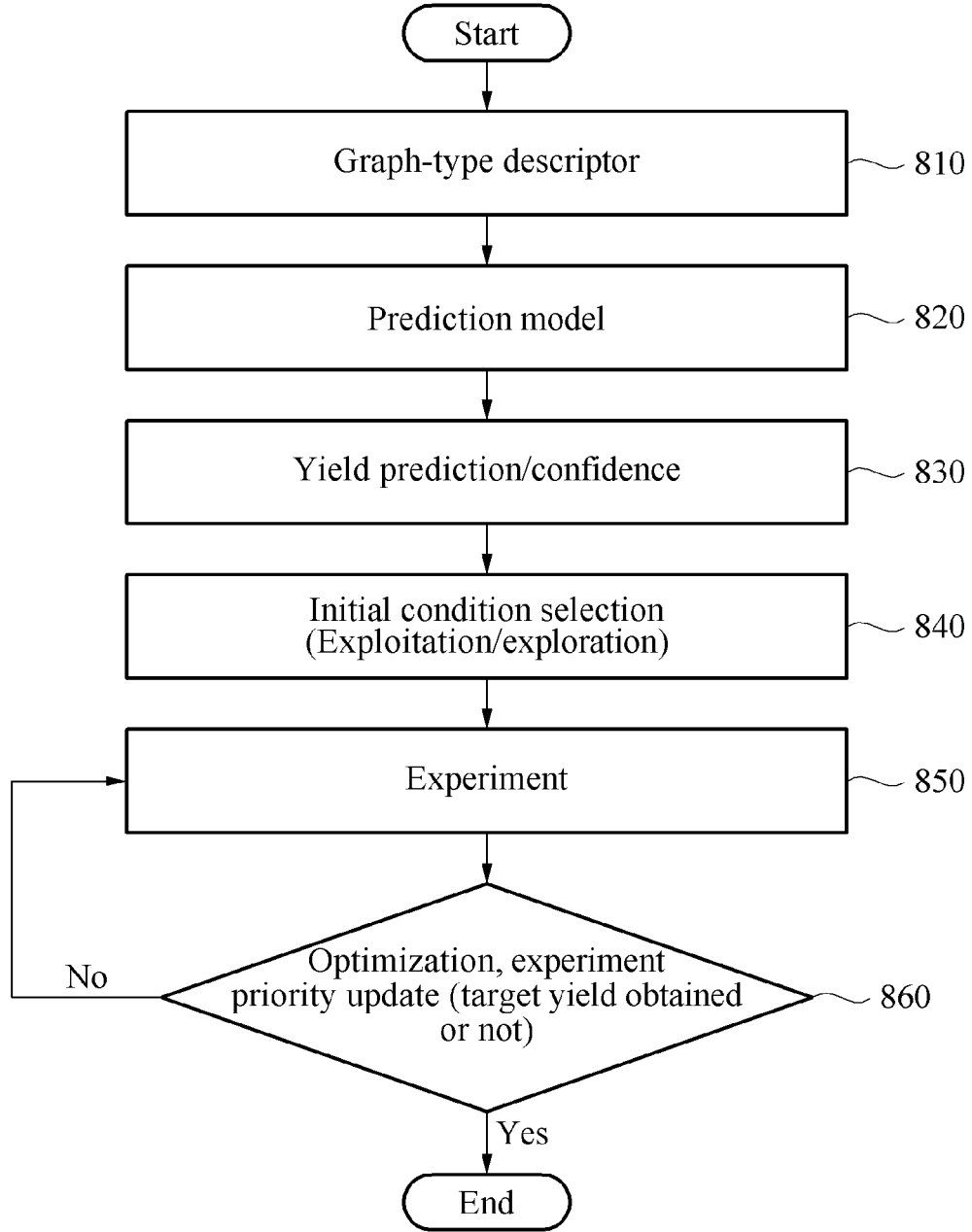
FIG. 8 is a flowchart illustrating another example of a method of optimizing synthetic conditions according to an example embodiment.

FIG. 8 is a flowchart illustrating another example of a method of optimizing synthetic conditions according to an example embodiment. Operations to be described hereinafter may be performed in sequential order, but not be necessarily performed in sequential order. For example, the order of the operations may change, and at least two of the operations may be performed in parallel.

Referring to FIG. 8, the optimizing apparatus may optimize synthetic conditions by performing operations 810 through 860 to be described hereinafter.

In operation 810, the optimizing apparatus may receive a graph-type descriptor. For example, the optimizing apparatus may receive, through a UI, the graph-type descriptor including 3D structural information of a reactant and 3D structural information of a target product to be synthesized by the reactant. Alternatively, the optimizing apparatus may also receive a reaction mechanism for generating the target product through the reactant.

In operation 820, the optimizing apparatus may determine combinations of synthetic conditions for generating the target product by applying the descriptor including a graph-type molecular structure to a neural network-based prediction model.

In operation 830, the optimizing apparatus may output yields corresponding to the combinations of the synthetic conditions determined by the prediction model in operation 820 and/or a confidence corresponding to the yields.

In operation 840, the optimizing apparatus may select an initial condition and/or an initial condition combination for an experiment. The optimizing apparatus may select the initial condition combination based on the confidence (e.g., a first confidence) corresponding to the yields of the combinations of the synthetic conditions.

For example, when an initial experiment is performed ten times, the optimizing apparatus may preferentially select a combination of synthetic conditions predicted by the prediction model for the ten times of the experiment. In this example, when the first confidence is low, the optimizing apparatus may preferentially select another combination of synthetic conditions relatively different from the combination predicted by the prediction model.

For example, under the assumption that the first confidence is 90% which is 75% higher than a preset threshold, the optimizing apparatus may select a combination of synthetic conditions predicted by the prediction model for nine out of the ten times corresponding to 90% (or a first ratio), and select a combination of random conditions or a combination of synthetic conditions different from the combination predicted by the prediction model for the remaining one time out of the ten times corresponding to 10% (or a second ratio).

For another example, under the assumption that a confidence of a result predicted by the prediction model is 20% which is 75% lower than the preset threshold, the optimizing apparatus may select a combination of synthetic conditions predicted by the prediction model as the initial condition combination for two times out of the ten times which corresponds to 20%, and select another combination of synthetic conditions that is not selected by the prediction model as the initial condition combination for eight times out of the ten times which corresponds to 80%.

In operation 850, the optimizing apparatus may perform the experiment with the initial condition combination determined in operation 840. For example, the optimizing apparatus may perform the experiment with the initial condition combination determined in operation 840 by a robot, and output an actual yield measured from a result of the experiment performed with the initial condition combination.

In operation 860, the optimizing apparatus may select an optimal combination of synthetic conditions based on a confidence (or a second confidence) of the prediction model, an error of the prediction model, the time of iterations, and the like. For example, after verifying an actual yield measured from a result of initial ten times of the experiment, the optimizing apparatus may determine a priority among the combinations of the synthetic conditions based on a difference between the actual yield and a predicted yield of the prediction model. In this example, the optimizing apparatus may assign different weights to combinations of synthetic conditions respectively corresponding to the actual yield and the predicted yield based on the second confidence and adjust a priority of the combinations of the synthetic conditions, and may thereby optimize the combinations of the synthetic conditions to obtain a high yield.

In operation 860, the optimizing apparatus may determine a priority of combinations of synthetic conditions for a subsequent time of the experiment through a comprehensive determination in which the prediction model trained through data and a yield inference method dependent on an actual experiment result such as a Bayesian optimization method are combined.

When obtaining an intended target yield through the foregoing operations, the optimizing apparatus may update the prediction model by storing the combinations of the synthetic conditions corresponding to the priority determined in operation 860 in a database used for training the prediction model, and use the database for further similar reactions.

Figure 9:
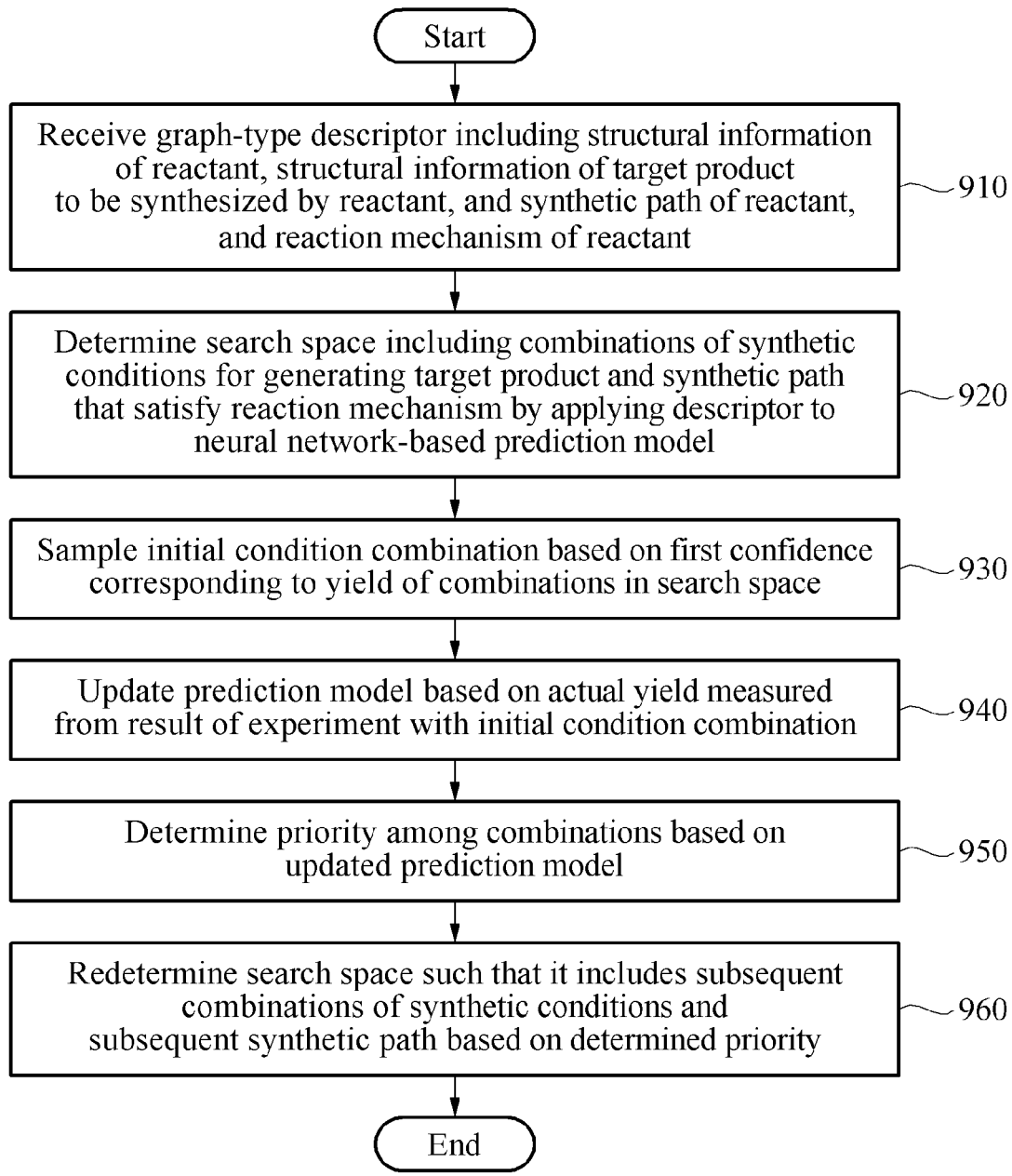
FIG. 9 is a flowchart illustrating still another example of optimizing synthetic conditions according to an example embodiment.

FIG. 9 is a flowchart illustrating still another example of a method of optimizing synthetic conditions according to an example embodiment. Operations to be described hereinafter may be performed in sequential order, but not be necessarily performed in sequential order. For example, the order of the operations may change, and at least two of the operations may be performed in parallel.

Referring to FIG. 9, the optimizing apparatus may optimize synthetic conditions by redetermining a search space by performing operations 910 through 960 to be described hereinafter.

In operation 910, the optimizing apparatus may receive a graph-type descriptor including structural information of at least one reactant, structural information of a target product to be synthesized by the reactant, and a synthetic path of the reactant, and receive a reaction mechanism of the reactant.

In operation 920, the optimizing apparatus may determine a search space including combinations of synthetic conditions for generating the target product and a synthetic path, which satisfy the reaction mechanism, by applying the descriptor to a neural network-based prediction model. The prediction model may include a neural network trained to predict at least one among combinations of synthetic conditions, predicted yields corresponding to the combinations of the synthetic conditions, a first confidence corresponding to the predicted yields, and a synthetic path, which satisfy the received reaction mechanism of the reactant.

In operation 930, the optimizing apparatus may sample at least one initial condition combination among the combinations based on a first confidence corresponding to a yield of the combinations in the search space determined in operation 920. The optimizing apparatus may determine a selectin ratio including a first ratio by which synthetic conditions predicted by the prediction model are selected to be the initial condition combination and a second ratio by which random conditions are selected to be the initial condition combination, and sample the initial condition combination based on the determined selection ratio. When the first confidence is greater than a preset threshold, the optimizing apparatus may increase the first ratio and decrease the second ratio. In contrast, when the first confidence is less than the preset threshold, the optimizing apparatus may increase the second ratio and decrease the first ratio.

In operation 940, the optimizing apparatus may update the prediction model based on an actual yield measured from a result of an experiment with the initial condition combination sampled in operation 930. The optimizing apparatus may update the prediction model based on a result of comparing a predicted yield corresponding to a combination of synthetic conditions determined by the prediction model and the actual yield from the result of the experiment with the initial condition combination.

In operation 950, the optimizing apparatus may determine a priority among the combinations of the synthetic conditions based on the prediction model updated in operation 940. The optimizing apparatus may compare a first yield corresponding to a combination of synthetic conditions predicted by the prediction model yet to be updated and a second yield corresponding to a combination of synthetic conditions predicted by the updated prediction model. For example, when the second yield is less than or equal to the first yield, the optimizing apparatus may determine a first combination corresponding to the first yield to have a higher priority and a second combination corresponding to the second yield to have a lower priority. In contrast, when the second yield is greater than the first yield, the optimizing apparatus may determine the second combination to have the higher priority and the first combination to have the lower priority.

In operation 960, the optimizing apparatus may redetermine the search space such that it includes subsequent combinations of synthetic conditions and a subsequent synthetic path based on the priority determined in operation 950. Here, as the prediction model is updated based on a result of an experiment with the subsequent combinations of the synthetic conditions, the priority may be redetermined, and the search space may be determined such that it includes next subsequent combinations of synthetic conditions based on the redetermined priority.

Figure 10:
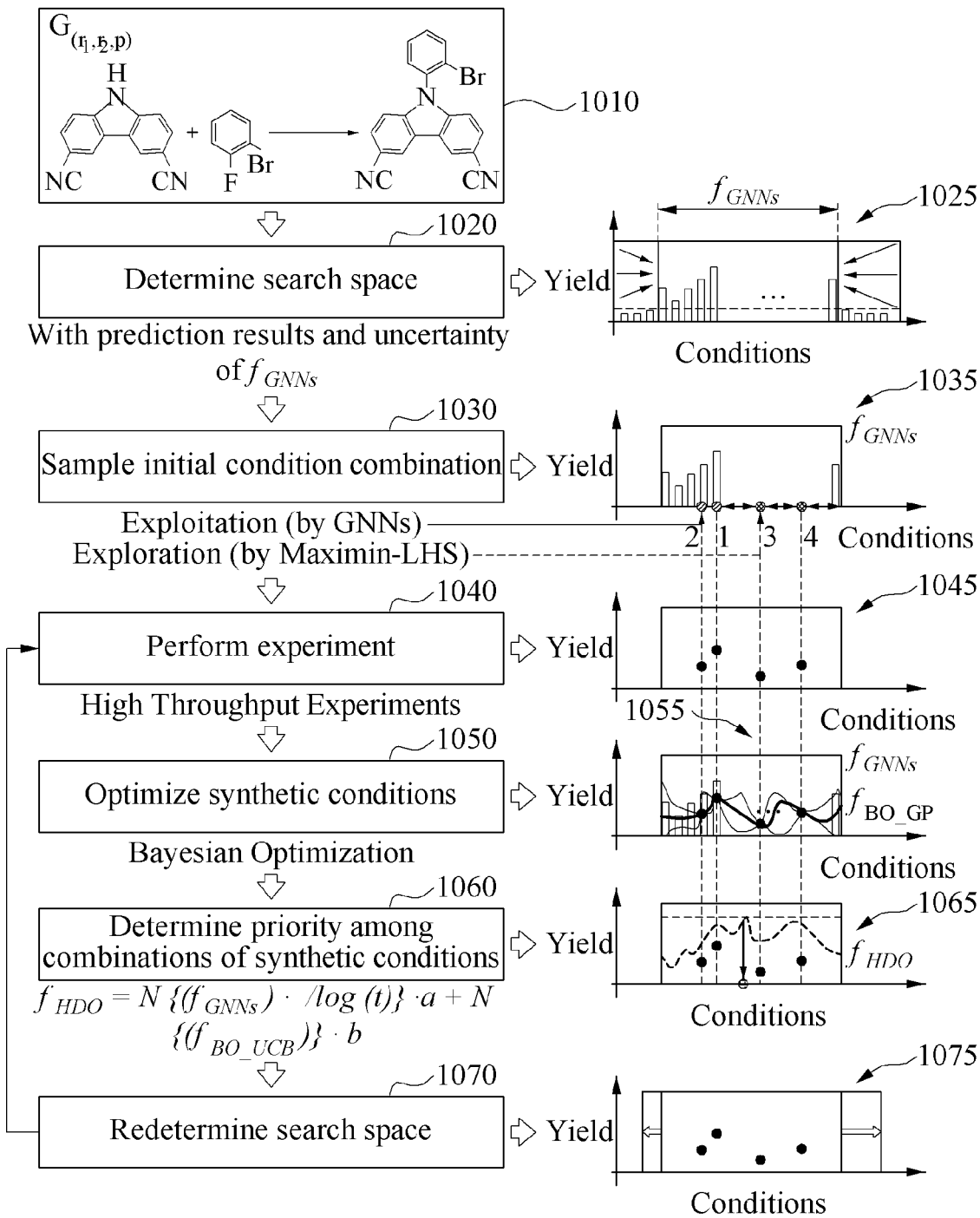
FIG. 10 is a diagram illustrating another example of a method of optimizing synthetic conditions according to an example embodiment.

FIG. 10 is a diagram illustrating another example of a method of optimizing synthetic conditions according to an example embodiment. Referring to FIG. 10, the optimizing apparatus may redetermine a search space.

When at least one reactant is given, the optimizing apparatus may automatically update an acquisition function (e.g., $f_{HDO}$) for calculating a priority among combinations of synthetic conditions for a subsequent experiment while iteratively performing the following operations.

In operation 1010, the optimizing apparatus may receive a graph-type descriptor (e.g., $G(r_1, r_2, p)$) including structural information of at least one reactant, structural information of a target product to be synthesized by the reactant, and a synthetic path of the reactant.

In operation 1020, the optimizing apparatus may determine a search space 1025 including combinations of synthetic conditions for generating the target product and a synthetic path, which satisfy a reaction mechanism, by applying the descriptor $G(r_1, r_2, p)$ to a neural network-based prediction model. For example, the optimizing apparatus may define the search space 1025 based on a reaction including, as a graph-type molecular structure, a structure of the reactant and a structure of the target product. The search space 1025 may be a space to which a predicted result of a GNN (e.g., $f_{GNNs}$) and an uncertainty corresponding to the predicted result are applied. For example, the optimizing apparatus may narrow the search space 1025 using the GNN model (e.g., $f_{GNNs}$) that predicts a chemical context (including, for example, a catalyst, a base, and a ligand) most suitable for a specific organic reaction in which the structure of the reactant and/or target product is given.

In operation 1030, the optimizing apparatus may sample an initial condition combination. For example, as illustrated in 1035, the optimizing apparatus may determine, for the initial condition combination, a selection ratio for sampling combinations (first and second combinations) of synthetic conditions predicted by the GNN by a first ratio (e.g., 50%), and sampling combinations of synthetic conditions (third and fourth combinations) predicted by maximum Lain hypercube sampling (maximum-LHS) by a second ratio (e.g., 50%).

For example, the optimizing apparatus may include an independent prediction model which is a multi-label classification model trained with approximately 10 million examples in a Reaxys database and configured to define candidate condition substances by each context condition area. The optimizing apparatus may select, from among limited candidates (candidate combinations of synthetic conditions), a combination of synthetic conditions from which a target yield is expected to be derived through an initial experiment.

The optimizing apparatus may determine the selection ratio of the combinations of the synthetic conditions based on a balance between exploitation and exploration in the search space 1025 to sample the initial condition combination. The optimizing apparatus may adopt candidates of conditions predicted by the GNN model (e.g., $f_{GNNs}$) by the first ratio and adopt combinations of synthetic conditions predicted using maximum-LHS by the second ratio, through sampling.

In operation 1040, the optimizing apparatus may perform an experiment (or the initial experiment) with the initial condition combination sampled in operation 1030 and output an actual yield measured from a result of the experiment as illustrated in a graph 1045. The actual yield may correspond to, for example, four initial condition combinations sampled in operation 1030. When performing the experiment with the initial condition combination sampled in operation 1030, the optimizing apparatus may learn a reaction result from a conversion yield measured by liquid chromatography-mass spectrometry (LC-MS) to obtain an objective function for a model $f_{BO\_UCB}$ to which an uncertainty is applied based on Bayesian optimization for an actual yield. It may be desirable to find an optimal combination of conditions through the initial experiment for obtaining a desired target yield. However, in many cases, it may not be easy to find the optimal combination through the initial condition combination.

In operation 1050, as illustrated in a graph 1055, the optimizing apparatus may optimize synthetic conditions by updating the prediction model based on the actual yield. In this case, the optimizing apparatus may optimize the synthetic conditions based on the predicted result of the GNN ($f_{GNNs}$) and the predicted result to which the uncertainty $F_{BO\_UCB}$ based on Bayesian optimization for the actual yield is applied.

In operation 1060, the optimizing apparatus may determine a priority among the combinations of the synthetic conditions based on the prediction model updated in operation 1050. The optimizing apparatus may calculate a priority of subsequent combinations of synthetic conditions in the form of ensemble based on a result history, the GNN model (e.g., $f_{GNNs}$), and an optimization model (GP). The optimizing apparatus may determine the priority through a comprehensive determination using an experiment result, a frequency of previous experiments, and an uncertainty of an objective function of the prediction model, in addition to the predicted result of the GNN model (e.g., $f_{GNNs}$), to maximize efficiency.

The optimizing apparatus may determine the priority $f_{HDO}$ based on Equation 2, for example.

$$f_{UHDO} = N\{(f_{GNNs}) \cdot /\log(t)\} \cdot a + N\{(f_{BO\_UCB})\} \cdot b \quad \text{[Equation 2]}$$

In Equation 2, t denotes the number of iterations, and N denotes a value of normalization for preventing a value on one side from absorbing information on another side because the value on one side is extremely stood out. In addition, a and b denote weights.

The optimizing apparatus may determine the priority among the combinations of the synthetic conditions by assigning a highest priority to a combination of synthetic conditions corresponding to a highest yield, as illustrated in 1065.

In operation 1070, the optimizing apparatus may redetermine the search space as illustrated in a graph 1075 such that it includes subsequent combinations of synthetic conditions and a subsequent synthetic path based on the priority determined in operation 1060, and then perform an experiment on the redetermined search space in operation 1040.

The optimizing apparatus may iteratively perform the foregoing operations until it finds an optimal combination of synthetic conditions from which the target yield is obtained, and update the prediction model each time an experiment is completed.

The foregoing operations may be applied to a platform in which an organic synthesis experiment is performed in a fully automated manner using, for example, a robot and management software.

FIG. 11 is a diagram illustrating an example of an optimizing apparatus according to an example embodiment. Referring to FIG. 11, an optimizing apparatus 1100 may include a UI 1110, a memory 1150, and a processor 1130. The UI 1100, the memory 1150, and the processor 1130 may be connected to one another through a communication bus 1105.

The UI 1110 may receive a graph-type descriptor including structural information of at least one reactant and structural information of a target product to be synthesized by the reactant. Also, the UI 1110 may be an input means for receiving a result of an experiment as feedback. The UI 1110 may include, for example, a keypad, a dome switch, a touchpad, a jog wheel, a jog switch, and the like, but is not limited thereto. The touchpad may include, for example, a contact capacitive type, a pressure resistive type, an infrared sensing type, a surface ultrasonic conduction type, an integral tension measurement type, a piezoelectric effect type, and the like, but is not limited thereto.

Alternatively, according to another example embodiment, the UI 1110 may receive a graph-type descriptor including structural information of at least one reactant, structural information of a target product to be synthesized by the reactant, and a synthetic path including at least one of substituents and reactors of the reactant, and receive a reaction mechanism of the reactant.

The processor 1130 may operate a neural network by executing at least one program stored in the memory 1150. The processor 1130 may determine combinations of synthetic conditions for generating the target product by applying the descriptor to a prediction model that is based on the neural network. The processor 1130 may select at least one initial condition combination from among the combinations based on a first confidence corresponding to a yield of the combinations of the synthetic conditions. The processor 1130 may update the prediction model based on an actual yield measured from a result of an experiment with the initial condition combination. The processor 1130 may determine a priority among the combinations based on the updated prediction model. The processor 1130 may determine subsequent combinations of synthetic conditions based on the determined priority. The processor 1130 may redetermine the priority as the prediction model is updated based on an actual yield measured from a result of an experiment with the subsequent combinations of the synthetic conditions. The processor 1130 may determine next subsequent combinations of synthetic conditions that follow the subsequent combinations based on the redetermined priority, and iteratively perform the redetermining of the priority and the determining of the next subsequent combinations until an actual yield measured from a result of an experiment with the next subsequent combinations satisfies a preset target yield.

The processor 1130 may update the prediction model by receiving an experiment result as feedback through the UI 1110.

The processor 1130 may execute executable instructions included in the memory 1150. When the instructions are executed in the processor 1130, the processor 1130 may invoke the neural network-based prediction model from the memory 1150 and apply the descriptor to the prediction model. The processor 1130 may execute a program and control the optimizing apparatus 1100. A code of the program executed by the processor 1130 may be stored in the memory 1150.

Alternatively, according to another example embodiment, the processor 1130 may determine a search space including combinations of synthetic conditions for generating a target product and a synthetic path, which satisfy a reaction mechanism, by applying a descriptor to a neural network-based prediction model. The processor 1130 may sample at least one initial condition combination among the combinations of the synthetic conditions based on a first confidence corresponding to a yield of the combinations in the search space. The processor 1130 may update the prediction model based on an actual yield measured from a result of an experiment with the initial condition combination. The processor 1130 may determine a priority among the combinations based on the updated prediction model. The processor 1130 may redetermine the search space such that it includes subsequent combinations of synthetic conditions based on the determined priority. In this case, as the prediction model is updated based on an actual yield measured from a result of an experiment with the subsequent combinations of the synthetic conditions, the priority may be redetermined accordingly, and the search space may be determined such that it includes next subsequent combinations of synthetic conditions based on the redetermined priority.

In addition, the processor 1130 may perform one or more, or all, of the methods or operations described above with reference to FIGS. 1 through 10. The processor 1130 may be a hardware-implemented processing device having a physically structured circuit to execute desired operations. The desired operations may include, for example, codes or instructions included in a program. The optimizing apparatus 1100 implemented by hardware may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The memory 1150 may store therein at least one program. In addition, the memory 1150 may store therein various sets of information generated during processing performed by the processor 1130. Alternatively, the memory 1150 may store therein the neural network-based prediction model. In addition, the memory 1150 may store therein various sets of data and programs. The memory 1150 may include a volatile memory or a nonvolatile memory. The memory 1150 may include a large-capacity storage medium such as a hard disk to store various sets of data therein.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks;

magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter.

The described hardware devices may be configured to act as one or more software modules in order to perform the operations of the above-described example embodiments, or vice versa.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of optimizing synthetic conditions, the method comprising:
    receiving a graph-based descriptor comprising at least one of structural information of at least one reactant and structural information of a target product to be synthesized by the at least one reactant;
    determining combinations of synthetic conditions for generating the target product by applying the graph-based descriptor to a prediction neural network model;
    selecting at least one initial condition combination from among the combinations based on a first confidence corresponding to a yield of the combinations;
    conducting a chemical synthesis experiment using the selected initial condition combination, and obtaining a ground-truth yield based on a result of the chemical synthesis experiment;
    updating the prediction neural network model based on a difference between the ground-truth yield and a predicted yield of the prediction neural network model;
    determining a priority of the combinations for a subsequent experiment based on the updated prediction neural network model, a model uncertainty, and a yield obtained via a yield inference method; and
    determining subsequent combinations of synthetic conditions based on the determined priority, and repeating the chemical synthesis experiment and the updating of the prediction neural network model until a target yield is achieved.

2. The method of claim 1, wherein the selecting of the initial condition combination comprises:
    determining a selection ratio for the initial condition combination based on the first confidence; and
    selecting the initial condition combination based on the selection ratio.

3. The method of claim 2, wherein the determining of the selection ratio comprises:
    determining the selection ratio comprising a first ratio by which synthetic conditions predicted by the prediction neural network model are selected to be the initial condition combination and a second ratio by which random conditions are selected to be the initial condition combination, based on the first confidence.

4. The method of claim 3, wherein the determining of the selection ratio comprises:
    based on the first confidence being greater than a preset threshold, increasing the first ratio and decreasing the second ratio; and
    based on the first confidence being less than the preset threshold, increasing the second ratio and decreasing the first ratio.

5. The method of claim 1, wherein the prediction neural network model is trained to predict at least one of the combinations, predicted yields corresponding to the combinations, and the first confidence corresponding to the predicted yields.

6. The method of claim 1, wherein the prediction neural network model uses a message passing neural network (MPNN) configured to determine the combinations according to a correlation between neighboring atoms in the at least one reactant based on the graph-based descriptor.

7. The method of claim 1, wherein the updating of the prediction neural network model comprises:
    updating the prediction neural network model based on a result of comparing a predicted yield corresponding to a combination of synthetic conditions determined by the prediction neural network model and the ground-truth yield.

8. The method of claim 1, wherein the determining of the priority comprises:
    comparing a first yield corresponding to a combination of synthetic conditions predicted by the prediction neural network model yet to be updated and a second yield corresponding to a combination of synthetic conditions predicted by the updated prediction neural network model; and
    determining the priority between the combinations based on a result of the comparing.

9. The method of claim 8, wherein the determining of the priority between the combinations based on the result of the comparing comprises:
    based on the second yield being less than or equal to the first yield, determining a first combination corresponding to the first yield to have a higher priority and determining a second combination corresponding to the second yield to have a lower priority; and
    based on the second yield being greater than the first yield, determining the second combination to have the higher priority and the first combination to have the lower priority.

10. The method of claim 1, wherein the determining of the subsequent combinations of the synthetic conditions comprises:
    redetermining the priority as the prediction neural network model is updated based on a ground-truth yield obtained from a result of an experiment with the subsequent combinations of the synthetic conditions;
    determining next subsequent combinations of synthetic conditions that follow the subsequent combinations based on the redetermined priority; and
    iteratively performing the redetermining of the priority and the determining of the next subsequent combinations until a ground-truth yield obtained from a result of an experiment with the next subsequent combinations satisfies a preset target yield.

11. The method of claim 1, wherein the synthetic conditions comprise at least one of a catalyst condition, a ligand condition, a base condition, a solvent condition, a temperature condition, a density condition, a humidity condition, a reaction time condition, and a pressure condition.

12. The method of claim 1, wherein the graph-based descriptor further comprises a synthetic path comprising at least one of substituents and reactors of the at least one reactant.

13. The method of claim 12, wherein the determining of the combinations of the synthetic conditions comprises:
determining the combinations of the synthetic conditions to satisfy a reaction mechanism of the at least one reactant by applying the graph-based descriptor to the prediction neural network model.

14. A method of optimizing synthetic conditions, comprising:
receiving a graph-based descriptor comprising structural information of at least one reactant and structural information of a target product to be synthesized by the at least one reactant, and a synthetic path of the at least one reactant, and receiving a reaction mechanism of the at least one reactant;
determining a search space comprising combinations of synthetic conditions for generating the target product and the synthetic path that satisfy the reaction mechanism by applying the graph-based descriptor to a prediction neural network model;
sampling at least one initial condition combination among the combinations based on a first confidence corresponding to a yield of the combinations in the search space;
conducting a chemical synthesis experiment using the sampled at least one initial condition combination, and obtaining a ground-truth yield based on a result of the chemical synthesis experiment;
updating the prediction neural network model based on a difference between the ground-truth yield and a predicted yield of the prediction neural network model;
determining a priority of the combinations for a subsequent experiment based on the updated prediction neural network model, a model uncertainty, and a yield obtained via a yield inference method; and
redetermining the search space to include subsequent combinations of synthetic conditions and a subsequent synthetic path based on the determined priority, and repeating the chemical synthesis experiment and the updating of the prediction neural network model until a target yield is achieved,
wherein, as the prediction neural network model is updated based on a result of an experiment with the subsequent combinations, the priority is redetermined, and the search space is determined to include next subsequent combinations of synthetic conditions that follow the subsequent combinations based on the redetermined priority.

15. The method of claim 14, wherein the sampling of the initial condition combination comprises:
determining a selection ratio comprising a first ratio by which synthetic conditions predicted by the prediction neural network model are selected to be the initial condition combination and a second ratio by which random conditions are selected to be the initial condition combination, based on the first confidence.

16. The method of claim 15, wherein the determining of the selection ratio comprises:
based on the first confidence being greater than a preset threshold, increasing the first ratio and decreasing the second ratio; and
based on the first confidence being less than the preset threshold, increasing the second ratio and decreasing the first ratio.

17. The method of claim 14, wherein the prediction neural network model is trained to predict at least one of the combinations, predicted yields corresponding to the combinations, the first confidence corresponding to the predicted yields, and the synthetic path, which satisfy the reaction mechanism.

18. The method of claim 14, wherein the updating of the prediction model comprises:
updating the prediction neural network model based on a result of comparing a predicted yield corresponding to a combination of synthetic conditions determined by the prediction neural network model and the ground-truth yield obtained from the result of the experiment with the initial condition combination.

19. The method of claim 14, wherein the determining of the priority comprises:
comparing a first yield corresponding to a combination of synthetic conditions predicted by the prediction neural network model yet to be updated and a second yield corresponding to a combination of synthetic conditions predicted by the updated prediction neural network model;
based on the second yield being less than or equal to the first yield, determining a first combination corresponding to the first yield to have a higher priority and determining a second combination corresponding to the second yield to have a lower priority; and
based on the second yield being greater than the first yield, determining the second combination to have the higher priority and the first combination to have the lower priority.

20. A non-transitory computer-readable storage medium storing instructions that are executable by a processor to perform the method of claim 1.

21. An apparatus for optimizing synthetic conditions, the apparatus comprising:
a user interface (UI) configured to receive a graph-based descriptor comprising at least one of structural information of at least one reactant and structural information of a target product to be synthesized by the at least one reactant;
a memory storing one or more instructions; and
a processor configured to execute the one or more instructions to:
determine combinations of synthetic conditions for generating the target product by applying the graph-based descriptor to a prediction neural network model, select at least one initial condition combination from among the combinations based on a first confidence corresponding to a yield of the combinations, conduct a chemical synthesis experiment using the selected initial condition combination, obtain a ground-truth yield based on the result of the chemical synthesis experiment, update the prediction neural network model based on based on a difference between the ground-truth yield and a predicted yield of the prediction neural network model, determine a priority of the combinations for a subsequent experiment based on the updated prediction neural network model, a model uncertainty, and a yield obtained via a yield inference method, determine subsequent combinations of synthetic conditions based on the determined priority, and repeat the chemical synthesis experiment and the updating of the prediction neural network model until a target yield is achieved,
wherein, as the prediction neural network model is updated based on a result of an experiment with the subsequent combinations, the priority is redetermined, and next subsequent combinations of synthetic conditions are determined based on the redetermined priority.

22. The apparatus of claim 21, wherein the processor is configured to:
determine a selection ratio for the initial condition combination based on the first confidence, and select the initial condition combination based on the determined selection ratio.

23. The apparatus of claim 22, wherein the processor is configured to:
determine the selection ratio comprising a first ratio by which synthetic conditions predicted by the prediction neural network model are selected to be the initial condition combination and a second ratio by which random conditions are selected to be the initial condition combination, based on the first confidence.

24. The apparatus of claim 23, wherein the processor is configured to:
based on the first confidence being greater than a preset threshold, increase the first ratio and decrease the second ratio; and
based on the first confidence being less than the preset threshold, increase the second ratio and decrease the first ratio.

25. The apparatus of claim 21, wherein the prediction neural network model is trained to predict at least one of the combinations, predicted yields corresponding to the combinations, and the first confidence corresponding to the predicted yields.

26. The apparatus of claim 21, wherein the prediction neural network model uses a message passing neural network (MPNN) configured to determine the combinations according to a correlation between neighboring atoms in the at least one reactant based on the graph-based descriptor.

27. The apparatus of claim 21, wherein the processor is configured to:
update the prediction neural network model based on a result of comparing a predicted yield of a combination of synthetic conditions determined by the prediction neural network model and the ground-truth yield.

28. The apparatus of claim 21, wherein the processor is configured to:
compare a first yield corresponding to a combination of synthetic conditions predicted by the prediction neural network model yet to be updated and a second yield corresponding to a combination of synthetic conditions predicted by the updated prediction neural network model; and
determine a priority between the combinations based on a result of the comparing.

29. The apparatus of claim 28, wherein the processor is configured to:
based on the second yield being less than or equal to the first yield, determine a first combination corresponding to the first yield to have a higher priority and determine a second combination corresponding to the second yield to have a lower priority; and
based on the second yield being greater than the first yield, determine the second combination to have the higher priority and the first combination to have the lower priority.

30. The apparatus of claim 21, wherein the processor is configured to:
redetermine the priority as the prediction neural network model is updated based on a ground-truth yield obtained from a result of an experiment with the subsequent combinations of the synthetic conditions;
determine next subsequent combinations of synthetic conditions based on the redetermined priority; and
iteratively perform the redetermining of the priority and the determining of the next subsequent combinations until another ground-truth yield obtained from a result of an experiment with the next subsequent combinations satisfies a preset target yield.

31. The apparatus of claim 21, wherein the synthetic conditions comprise at least one of a catalyst condition, a ligand condition, a base condition, a solvent condition, a temperature condition, a density condition, a humidity condition, a reaction time condition, and a pressure condition.

32. The apparatus of claim 21, wherein the graph-based descriptor further comprises a reaction mechanism of the at least one reactant.

33. The apparatus of claim 21, wherein the processor is further configured to:
determine the combinations of the synthetic conditions to satisfy a reaction mechanism of the at least one reactant by applying the graph-based descriptor to the prediction neural network model.

34. An apparatus for optimizing synthetic conditions, the apparatus comprising:
a user interface (UI) configured to receive a graph-based descriptor comprising structural information of at least one reactant, structural information of a target product to be synthesized by the at least one reactant, and a synthetic path comparing at least one of substituents and reactors of the at least one reactant, and receive a reaction mechanism of the at least one reactant;
a memory storing one or more instructions; and
a processor configured to execute the one or more instructions to:
determine a search space comprising combinations of synthetic conditions for generating the target product and a synthetic path, which satisfy the reaction mechanism, by applying the graph-based descriptor to a prediction neural network model;
sample at least one initial condition combination among the combinations based on a first confidence corresponding to a yield of the combinations in the search space;
conduct a chemical synthesis experiment using the sampled at least one initial condition combination, and obtain a ground-truth yield based on a result of the chemical synthesis experiment,
update the prediction neural network model based on a difference between the ground-truth yield and a predicted yield of the prediction neural network model;
determine a priority of the combinations for a subsequent experiment based on the updated prediction neural network model, a model uncertainty, and a yield obtained via a yield inference method; and
redetermine the search space to include subsequent combinations of synthetic conditions based on the determined priority, and repeat the chemical synthesis experiment and the updating of the prediction neural network model until a target yield is achieved,
wherein, as the prediction neural network model is updated based on a ground-truth yield obtained from a result of an experiment with the subsequent combinations of the synthetic conditions, the priority is redetermined, and the search space is determined to include next subsequent combinations of synthetic conditions based on the redetermined priority.

35. The apparatus of claim 34, wherein the prediction neural network model is trained to predict at least one of the combinations, predicted yields corresponding to the combinations, the first confidence corresponding to the predicted yields, and the synthetic path, which satisfy the reaction mechanism.

\* \* \* \* \*